United States Patent [19]
Oyama

[11] Patent Number: 5,732,125
[45] Date of Patent: Mar. 24, 1998

[54] METHOD OF CAPTURING A CONTROL CHANNEL FOR CALLS FOLLOWING AN EMERGENCY CALL

[75] Inventor: Mitsukazu Oyama, Kawasaki, Japan

[73] Assignee: Fujitsu Limited, Kawasaki, Japan

[21] Appl. No.: 508,581

[22] Filed: Jul. 28, 1995

[30] Foreign Application Priority Data

Oct. 20, 1994 [JP] Japan ................................. 6-255415

[51] Int. Cl.⁶ .................. H04M 11/00; H04M 11/04; H04Q 7/00
[52] U.S. Cl. .................. 379/58; 379/37; 455/34.2
[58] Field of Search ................................. 379/58, 59, 60, 379/201, 41, 37, 39, 45, 46; 455/33.1, 17, 54.1

[56] References Cited

U.S. PATENT DOCUMENTS

| | | | |
|---|---|---|---|
| 4,430,755 | 2/1984 | Nadir et al. | 379/58 X |
| 4,926,496 | 5/1990 | Cole et al. | 455/17 X |
| 5,159,625 | 10/1992 | Zicker | 379/59 |
| 5,212,808 | 5/1993 | Su et al. | 379/60 X |
| 5,305,370 | 4/1994 | Kearns et al. | 379/40 X |
| 5,444,664 | 8/1995 | Kuroda et al. | 365/226 |
| 5,465,388 | 11/1995 | Zicker | 455/33.1 |
| 5,555,286 | 9/1996 | Tendler | 379/41 X |
| 5,563,931 | 10/1996 | Bishop et al. | 379/37 X |
| 5,613,213 | 3/1997 | Naddell et al. | 455/34.1 X |

FOREIGN PATENT DOCUMENTS

| | | |
|---|---|---|
| 2185130 | 7/1990 | Japan . |
| 548523 | 2/1993 | Japan . |

*Primary Examiner*—Dwayne Bost
*Assistant Examiner*—Scott Richardson
*Attorney, Agent, or Firm*—Greer, Burns & Crain, Ltd.

[57] ABSTRACT

To perform control of a mobile telephone system which uses a dedicated control channel type multichannel access system, when an emergency telephone call is made from a mobile telephone to the police or fire department, the mobile telephone references a memory into which is stored the identification code of a service area within which calling is permitted, the base station having the highest received field strength of the control channel radio signals of base stations in this service area is selected and the emergency call is made to the thus selected base station. When doing this, the mobile telephone stores the identification code of the base station to which the emergency call was made, and when a next call is made after the emergency call is completed, the call signal is sent on the control channel of the base station to which the emergency call was made, based on the thus stored identification code of the base station.

17 Claims, 27 Drawing Sheets

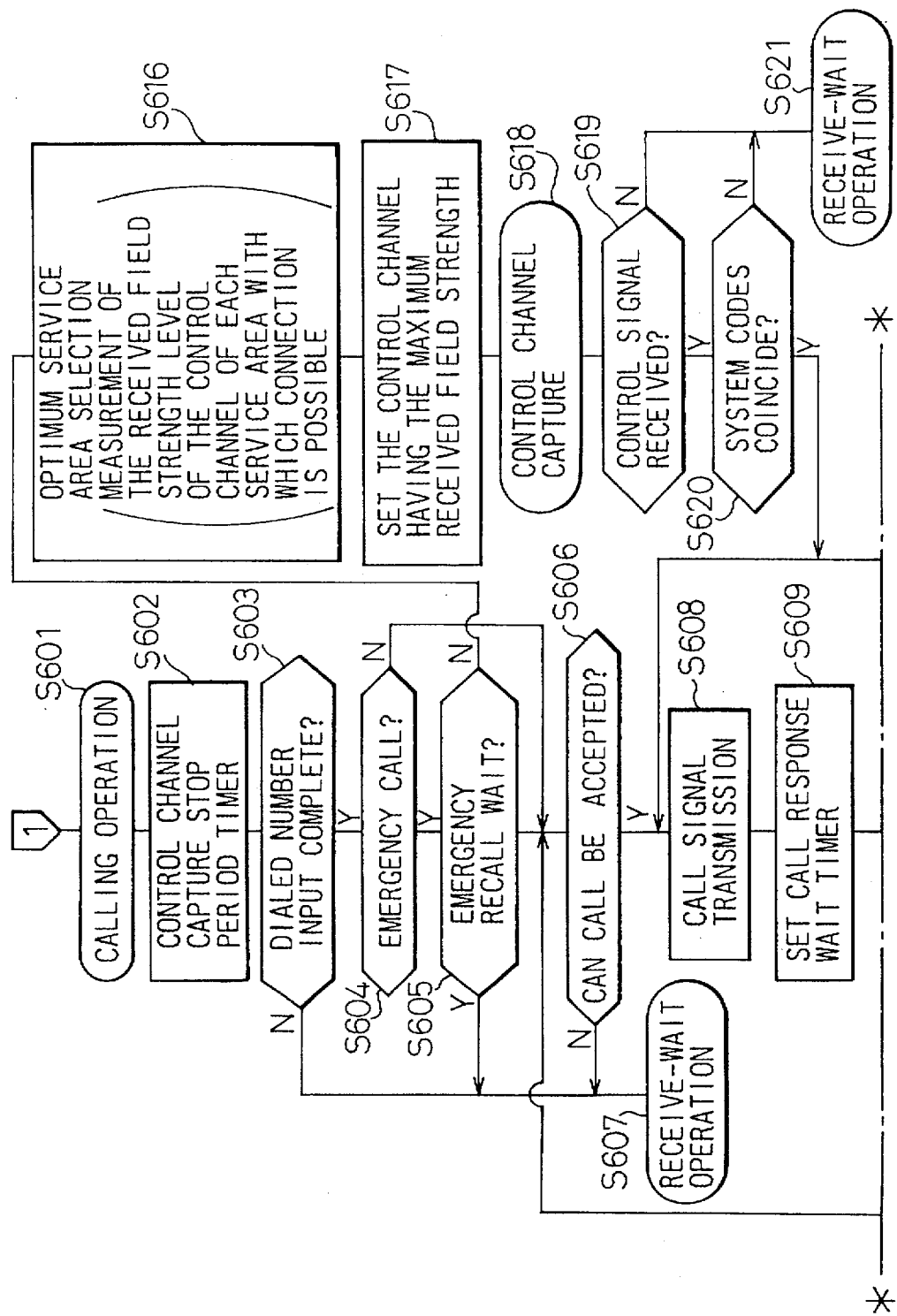

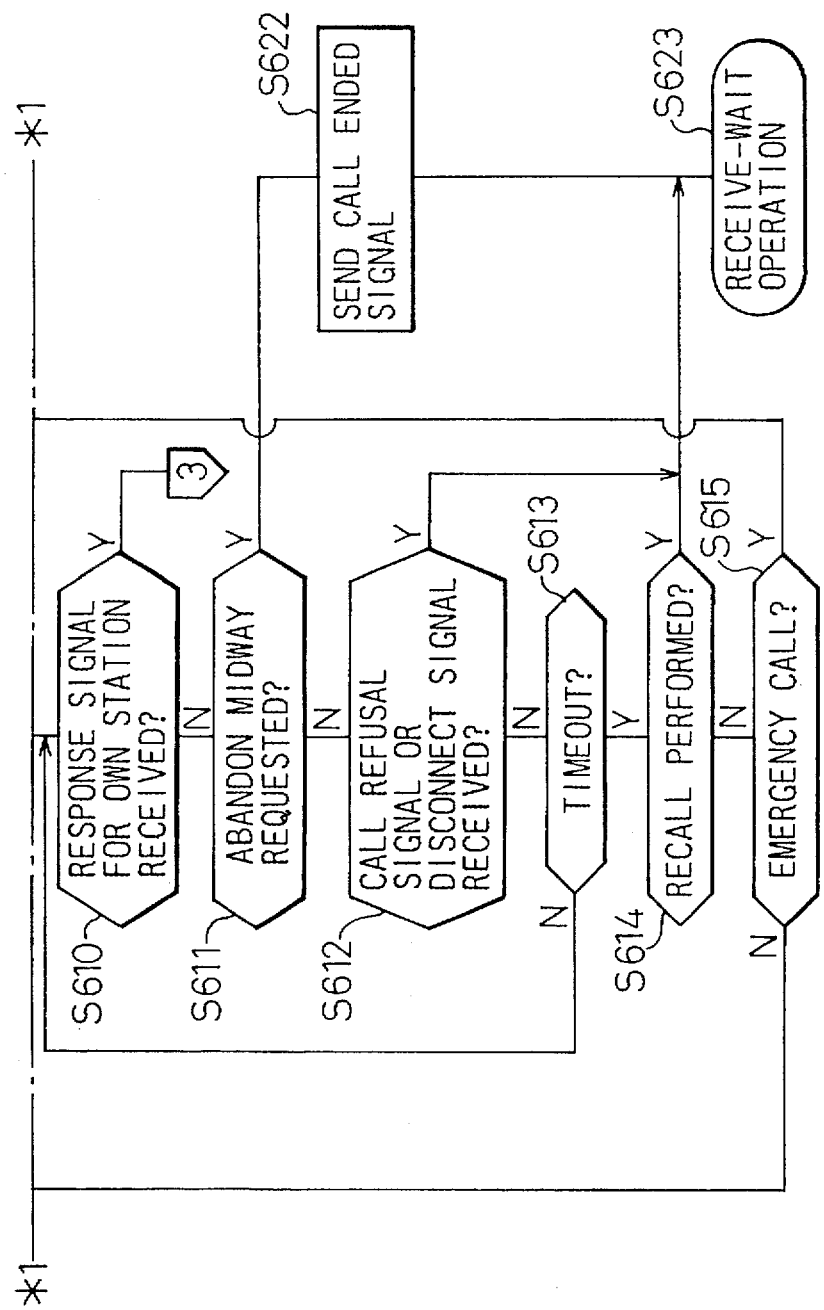

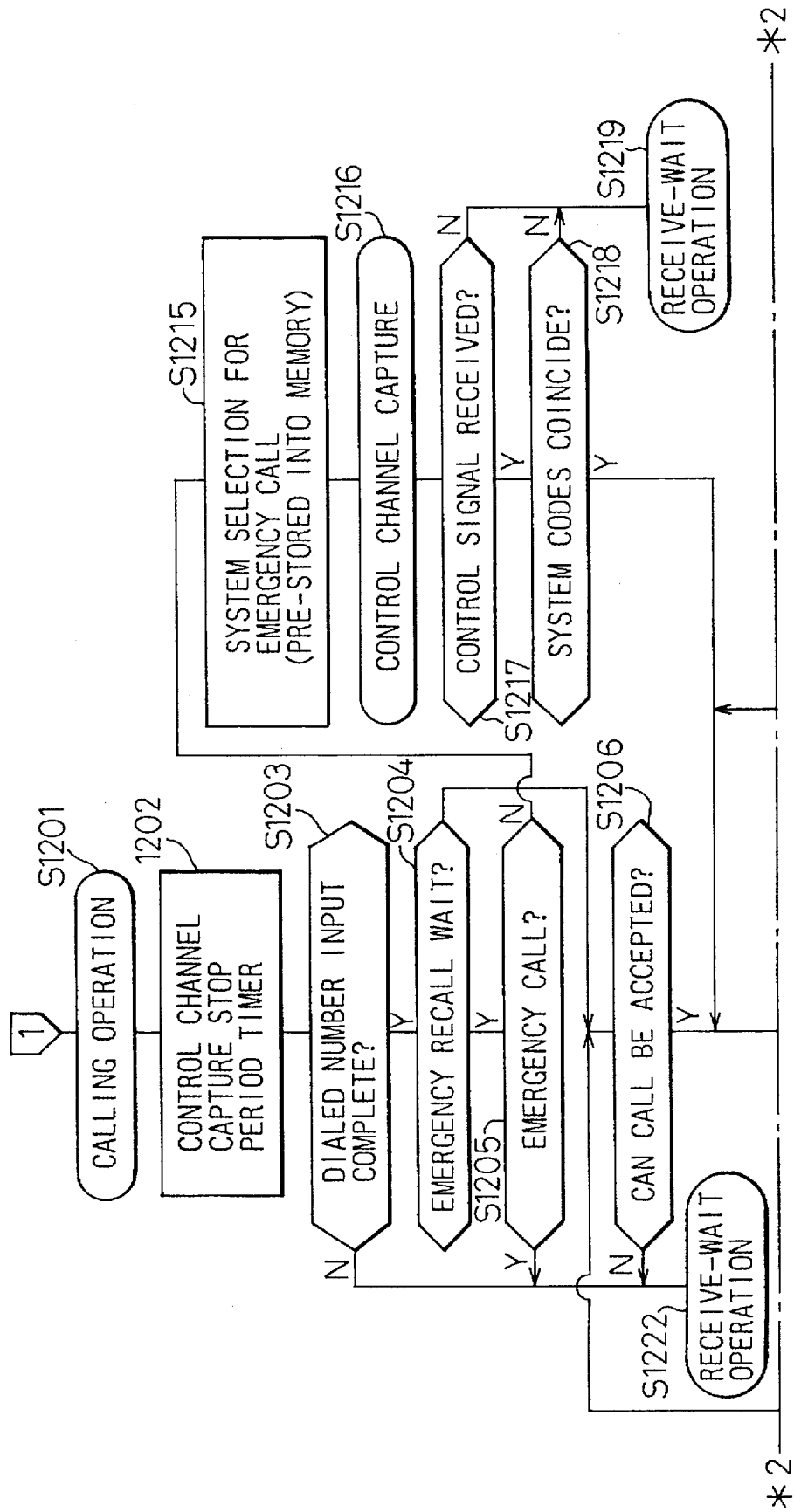

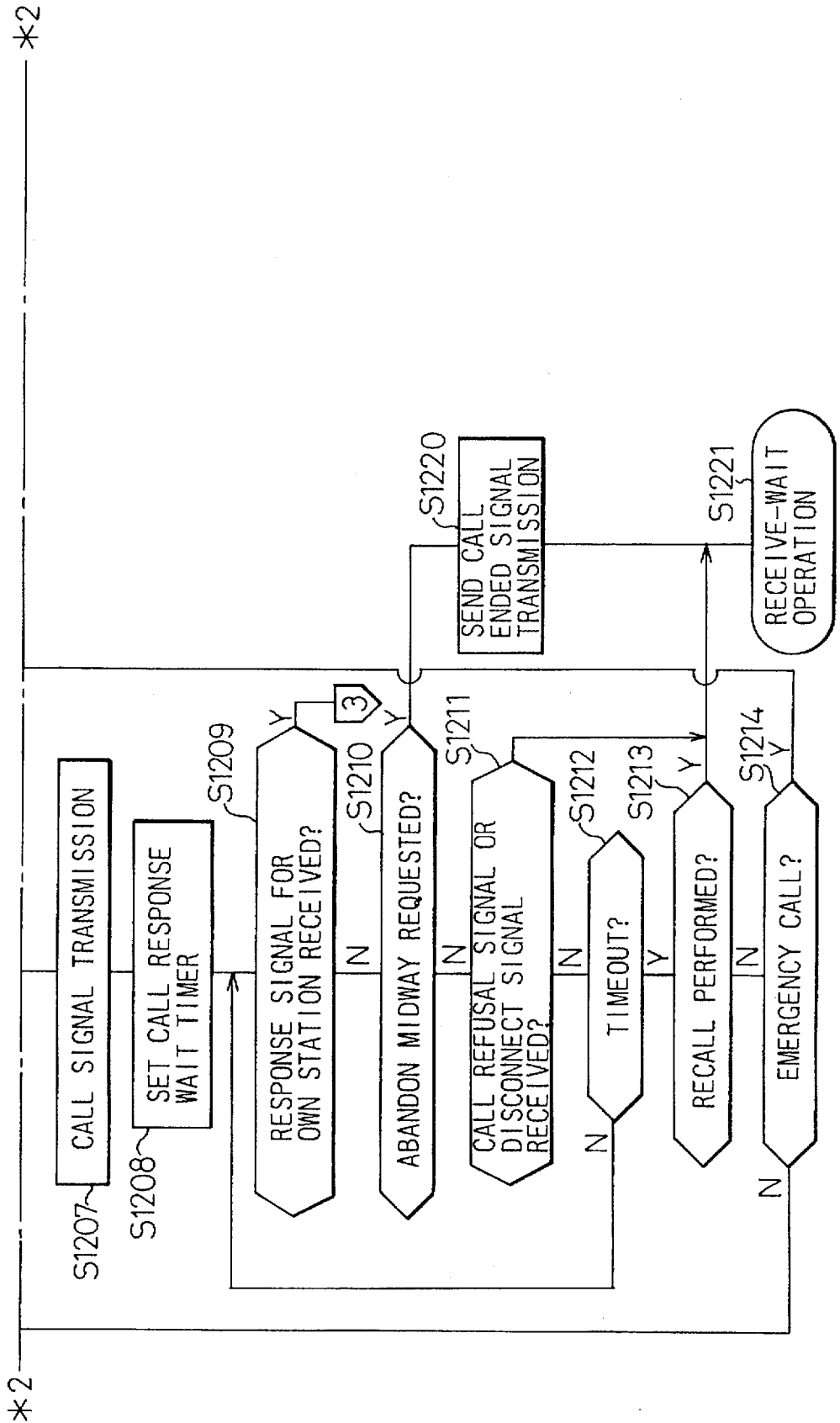

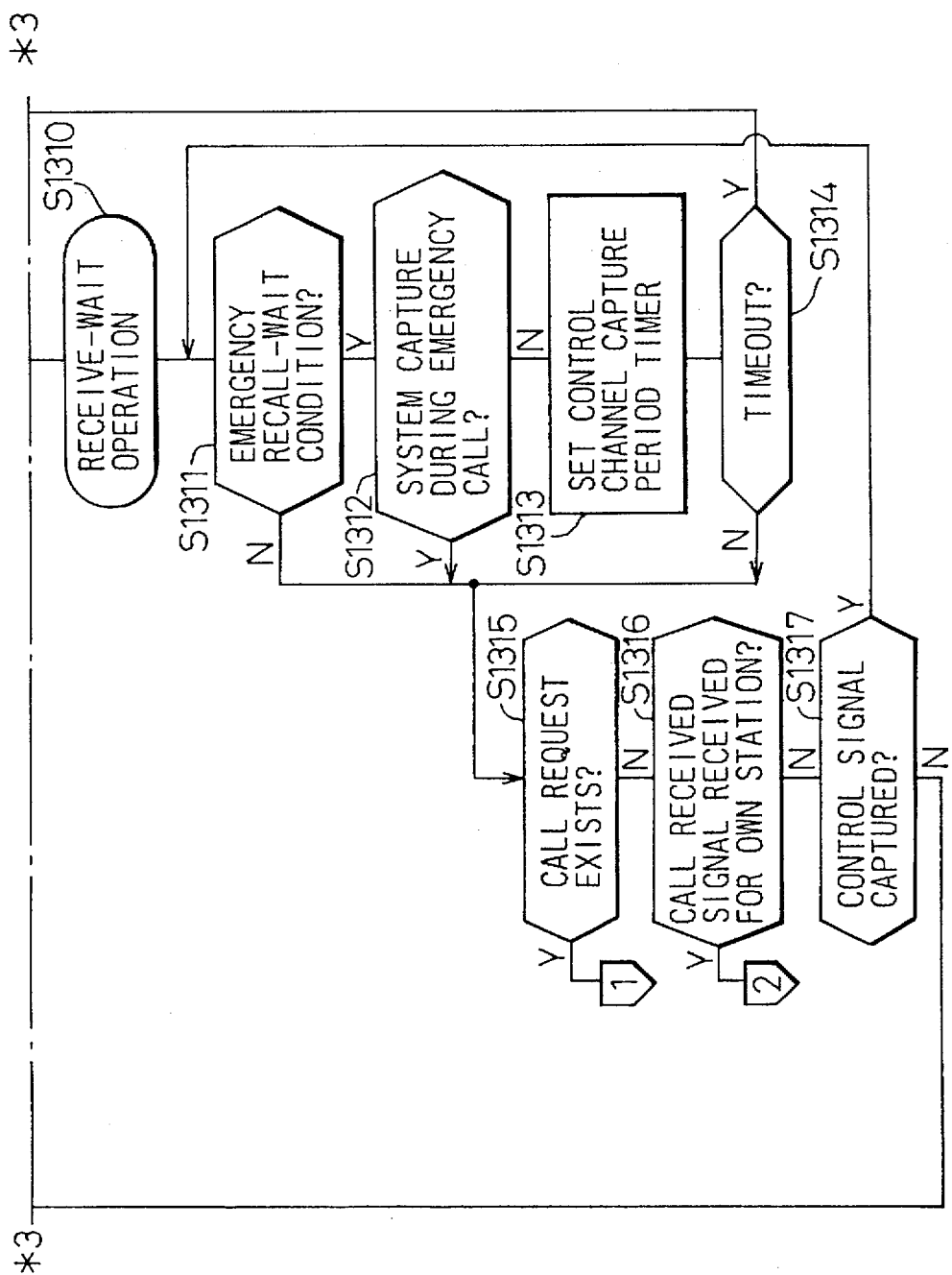

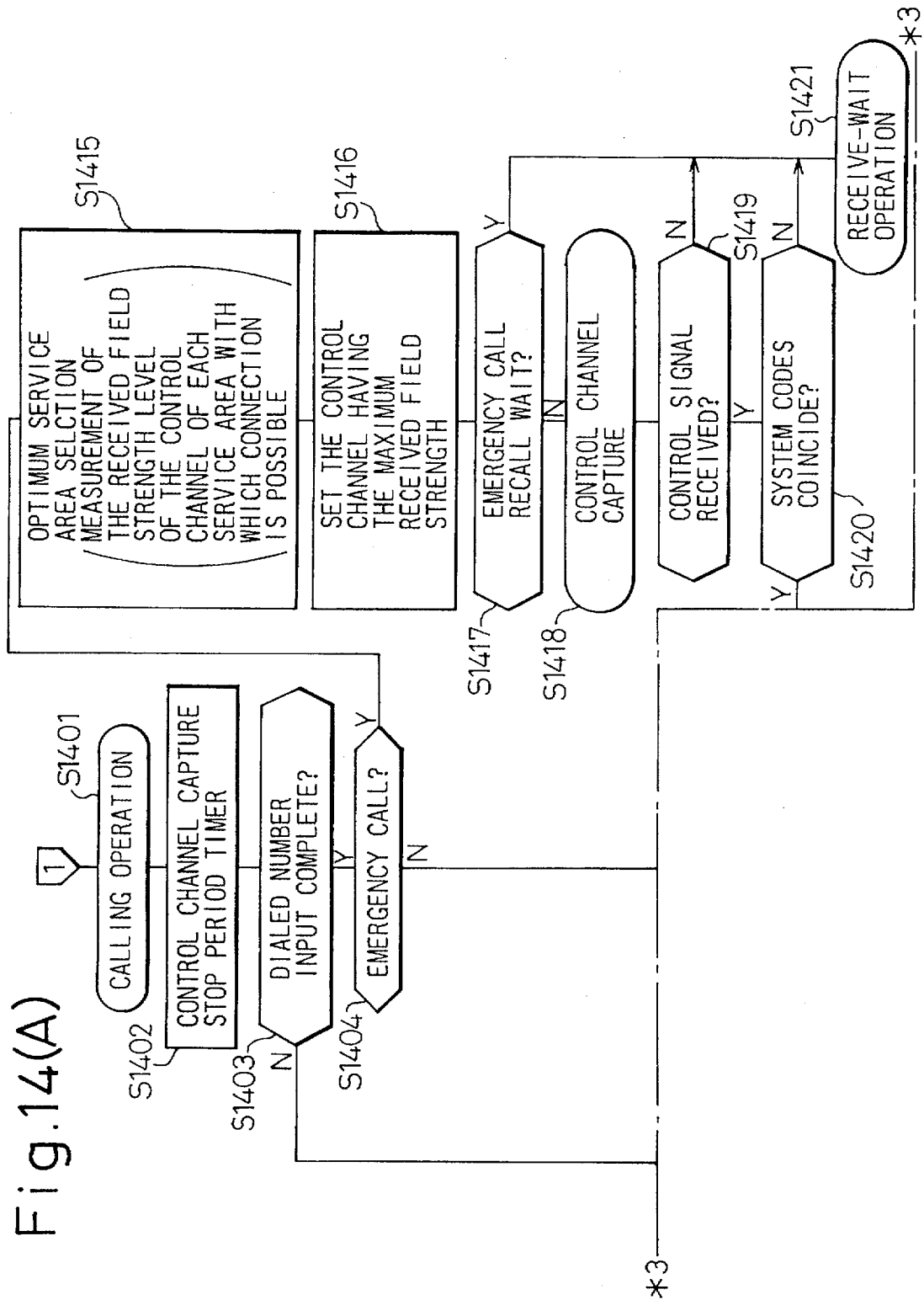

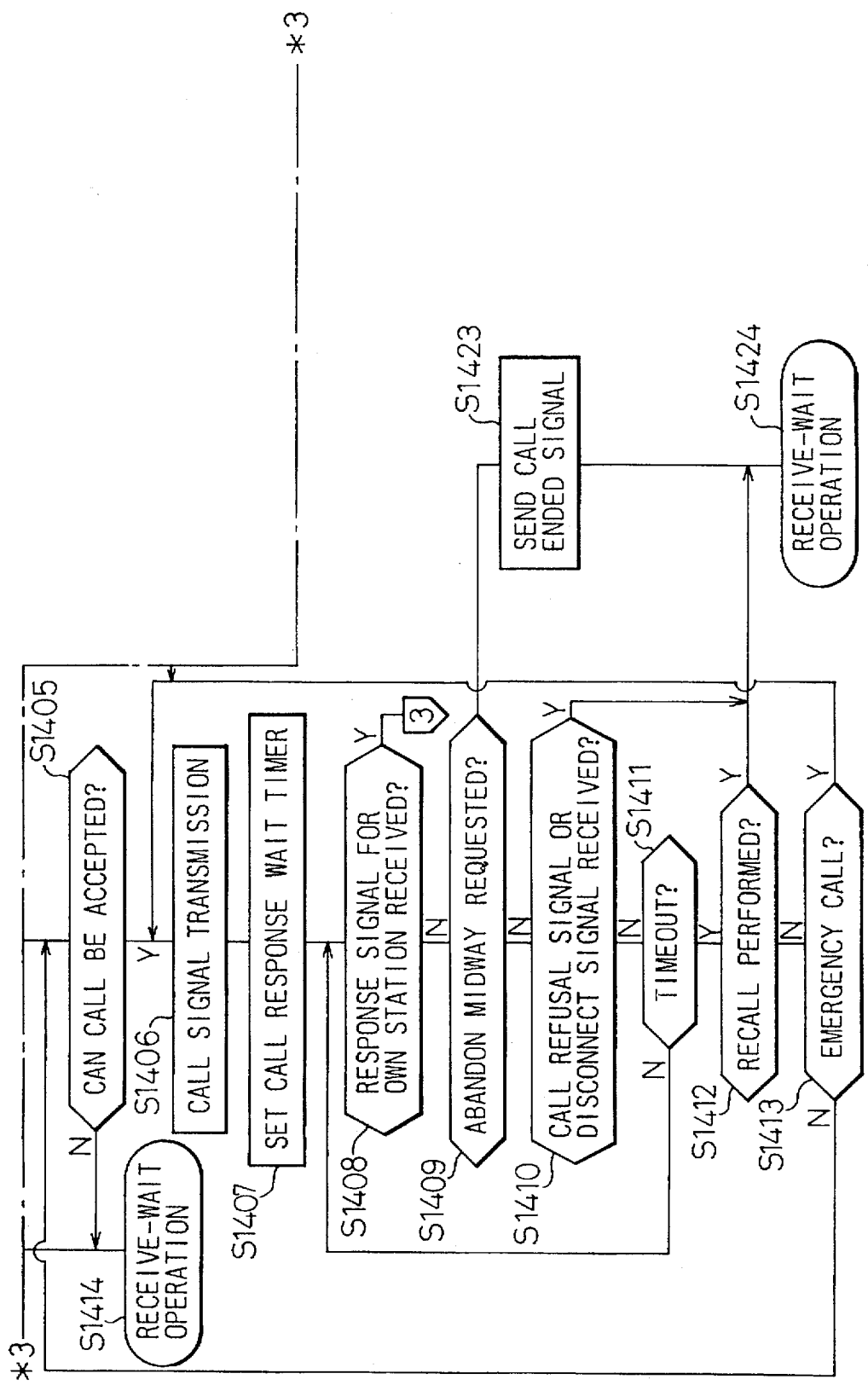

METHOD OF CAPTURING A CONTROL CHANNEL FOR CALLS FOLLOWING AN EMERGENCY CALL

BACKGROUND OF THE INVENTION

1. Field of the Invention

The present invention relates to a mobile telephone system, and more specifically to an emergency call control method in a mobile telephone system which uses a dedicated control channel type multichannel access system.

2. Description of the Related Art

With regard to emergency telephone calls made using a mobile telephone system to such emergency services as the police or fire department, there is a desire for the emergency service operator to be able to recall the person who has made the emergency call, even if the mobile telephone has been hung up. For this reason, the calling signal sent by the base station for a purpose of recalling the mobile telephone from which the emergency call was issued (the calling signal with respect to the mobile telephone) must be received reliably by the mobile telephone.

In a mobile telephone system, whether a telephone call is terminated normally or terminated because of a loss of the radio signal, at the point of the end of the call the mobile telephone receives the radio signals from the control channels which are assigned to each service area and which are stored in an internal memory, and goes into the receive-wait condition either on the control channel having the highest received field strength or on the first control channel having a received field strength that exceeds a threshold value. Therefore, there are cases in which the service area in which the receive-wait condition is enabled after a call is completed is different from the service area in which the immediately previous telephone call was made.

When recall of a mobile telephone from which an emergency call was made is performed from the emergency service incoming switchboard, by means of operations performed at the switchboard, in the case of a city-type mobile telephone system, in which the zones are small, because the position of the mobile telephone is stored and because the base station has a switching function which tracks the mobile telephone, as long as the telephone remains within the service area, although the associated control is complex, it is possible for the base station to recall the mobile telephone from which the emergency call was made, with a probability that is in accordance with the probability for that area.

However, in large-zone mobile telephone systems which cover large areas such as farming areas (these having, at present, two to three zones), the above-noted storage of position and tracking switching functions are not implemented, and each of the service areas, which have their own local police headquarters which has an emergency call receiving switchboard, is connected via dedicated lines or the like. For this reason, if after an emergency call from a mobile telephone the channel on which mobile telephone is to go into the receive-wait condition is to be arbitrarily selected by means of the control channel received field strength or the like, in a region in which a number of service areas mutually overlap, there are cases in which the control channel for receive-wait changes after the emergency call. As a result, in the case of a large-zone system, there is a problem in that the probability of a recall succeeding drops considerably.

SUMMARY OF THE INVENTION

In consideration of the above-described situation, an object of the present invention is to provide an emergency call control method in which an identification code of a base station is stored in the mobile station which makes the emergency call, a control channel of the base station being used after the emergency call to make the next recall, so that the recall from the emergency switchboard succeeds, even in a large-zone mobile telephone system.

According to the present invention, an emergency call control method is provided in which an identification code of a service area when an emergency call is made is held in the mobile telephone terminal used in a mobile telephone system, the control channel being captured after the emergency call, based on the thus held identification code.

In addition, according to the present invention, an emergency call control method is provided in a mobile telephone system which uses a dedicated control channel type multichannel access system as the method of radio circuit assignment. When an emergency telephone number is called by a mobile telephone, the mobile telephone references a memory into which is stored the identification code of a service area within which calling is permitted. The base station having the highest received field strength of the control channel radio signals of base stations in the above-noted service area is selected and the emergency call is made to the thus selected base station. The base station identification code to which the emergency call was made is stored, and when the mobile telephone is called after the completion of the emergency call, the calling signal is sent by using the control channel of the base station to which the emergency call was made by means of the identification code which had been stored.

The above-noted mobile telephone adds a coding error checking code to the identification code of the field strength which has been notified of the emergency before storing it, and performs a coding check of this when performing readout. The stored field strength identification code is only used in a normal calling operation if this check is passed. The identification codes of the field strength with an emergency call from the above-noted mobile telephone are stored in two differing two-digit address areas, the difference between the above-noted address areas being made larger than the miswritten memory access area spread caused by a power supply voltage change expected when the power supply of the above-noted mobile telephone is switching on/off.

In the case in which the coding check of a read-out base station identification code fails, the base station identification code from the other of the above-noted two address areas is read out, this data being used if it passes the coding error check. The base station identification code stored in the other address, which failed the coding error check, is replaced by the base station identification code which passed the coding error check, so that the contents of the two areas always coincide. After completion of the emergency call by the mobile telephone, if it makes a call, and the base station recognizes the call, returning a call response signal, the above-noted stored base station identification code is deleted.

In addition, the present invention provides an emergency call apparatus having a memory into which is stored an identification code for the service area in which calling is permitted, wherein when an emergency report is made, the emergency call is made via a control channel of the service area which had been captured based on the contents of the above-noted memory, the identification code of the base station to which the above-noted emergency call is made being stored, and a calling signal being sent on the control channel of the base station which had been stored, when next calling after the above-noted emergency call is completed by the mobile telephone.

Additionally, in the above-noted mobile telephone emergency call control apparatus, the identification code of the emergency call receiving base station in the service area used in the case of making an emergency report is stored beforehand, the emergency call being made via the control channel of the service area specified by the above-noted identification code, the fact that an emergency call has been made being stored, and when next making a call after the emergency call has been completed, the call signal is sent via the control channel of the service area pre-stored in the mobile telephone for the purpose of making an emergency call. The above-noted emergency call base station identification code is stored along with an added coding error check code into two different addresses in a ROM, a battery backed up RAM or an EEPROM in the mobile telephone.

In addition, in the above-noted mobile telephone emergency call control apparatus, when reception of the radio signal from the base station in the service area in which the emergency call had been made becomes impossible, if it becomes possible to receive a radio signal from another service area which had been stored in memory in the mobile telephone, in the service area in which calling has become possible, although a new emergency call is prohibited, it is possible to make and receive normal calls, and it is possible in the service area in which communication has become possible to make new emergency calls and to make and receive normal calls.

In addition, according to the present invention, a base station emergency call control apparatus is provided, wherein at a base station in a service area which has received an emergency call, in the case in which the mobile telephone that made an emergency call recalls before the operator at the emergency call switchboard has performed a disconnect operation, a refusal signal is sent with respect to the above-noted recall, and in the case in which the mobile telephone that made an emergency call recalls after the operator at the emergency call switchboard has performed a disconnect operation, a response signal is sent with respect to the recall, the above-noted mobile telephone performing calling processing.

In the above-noted emergency call control apparatus, at a base station in a service area which has received an emergency call, in the case in which the operator at the emergency call switchboard performs a disconnect operation or in which a prescribed amount of time has elapsed from the time of the formation of a link between the mobile telephone making the emergency call and the emergency call switchboard, a disconnect signal is sent to the above-noted mobile telephone via the call channel which was used for the emergency call to reset the call channel, and the thus reset call channel is re-allocated for normal calls.

According to the present invention, by capturing the control channel after an emergency call based on the identification code for the service area in which the emergency call was made, it becomes impossible to capture the control channel for a base station other than the one to which the emergency call was made, and it becomes possible to perform a recall from the switchboard that received the emergency call.

The mobile telephone stores the system code of the base station to which the emergency call was made, and makes a subsequent call to that stored base station, the subsequent call being controlled after the emergency call by the emergency call switchboard via the base station.

The above-noted system code of the base station that receives the emergency call is written into a battery backed-up RAM or EEPROM, or the like, thereby accommodating the condition in which power is lost. In addition, to prevent miswriting into the above-noted memory or destruction of memory contents, a coding error check code is added to the above-noted system code, and this is written into two memory locations having a prescribed distance between memory addresses.

When an emergency call is made from the above-noted mobile telephone to a base station, an initially set identification code for an emergency call base station is used in addition to the control channel having the maximum received field strength, thereby providing reliable and easy selection of the base station.

In addition, in the case in which it becomes impossible to receive the control channel from the base station to which the emergency call had been sent, and in which it becomes possible to receive the control channel from a different service area, normal calling and receiving of calls is permitted in that area, and additionally, emergency calls are permitted in that area, to provide flexibility in making emergency calls.

BRIEF DESCRIPTION OF THE DRAWINGS

The present invention will be more clearly understood from the description as set forth below, with reference to the accompanying drawings, wherein:

FIG. 6(A) is flowchart (2-1) which shows an example of the control operation in a mobile telephone;

FIG. 6(B) is flowchart (2-2) which shows an example of the control operation in a mobile telephone;

FIG. 12(A) is flowchart (8-1) which shows an example of the control operation in a mobile telephone;

FIG. 12(B) is flowchart (8-2) which shows an example of the control operation in a mobile telephone;

FIG. 13(B) is flowchart (9-2) which shows an example of the control operation in a mobile telephone;

FIG. 14(A) is flowchart (10-1) which shows an example of the control operation in a mobile telephone;

FIG. 14(B) is flowchart (10-2) which shows an example of the control operation in a mobile telephone;

DESCRIPTION OF THE PREFERRED EMBODIMENT

Figure 1:
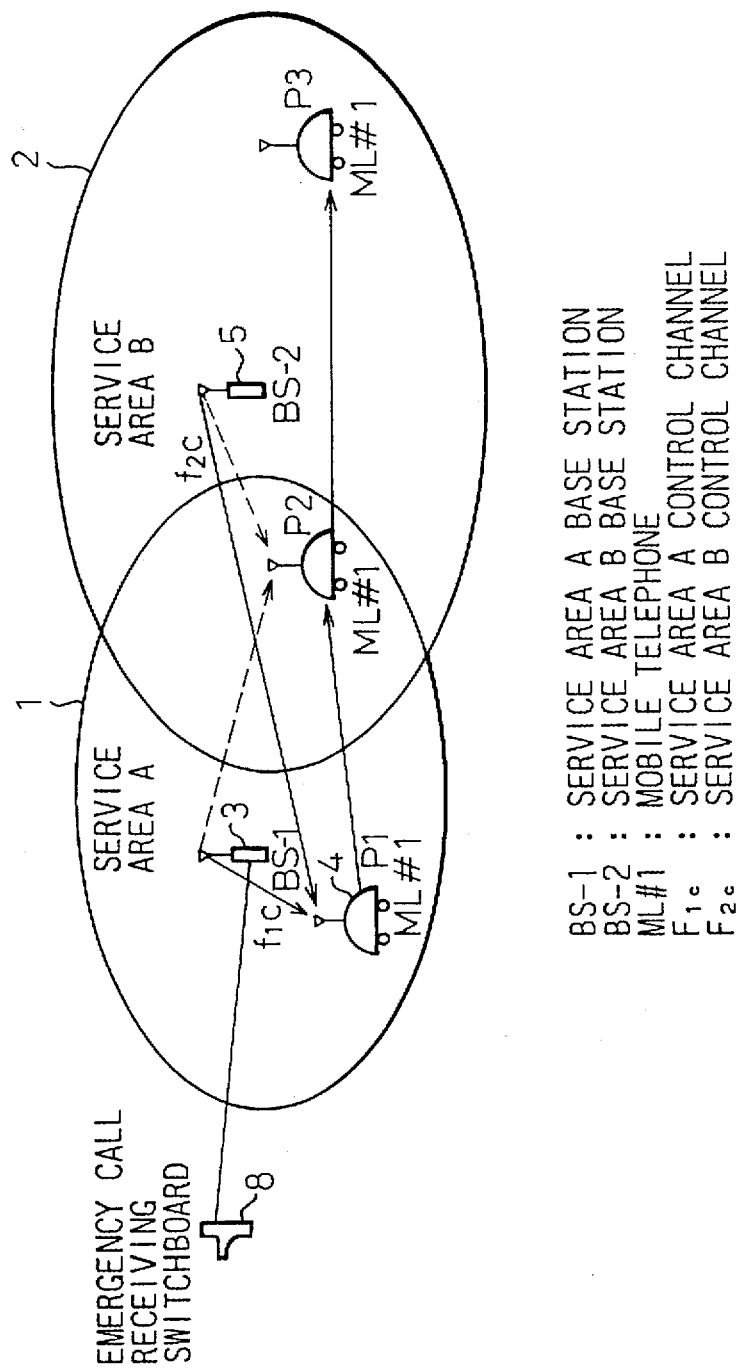
FIG. 1 is a drawing which shows an example of the configuration of a service area applied to an emergency call control method according to the present invention.

FIG. 1 shows an example of the configuration of a large-zone service area to which the present invention is applied.

Referring to FIG. 1 as a means of describing the present invention, the mobile telephone 4 (ML (mobile) #1) which exists at point P1 of the service area A1 can receive the radio signal on the control channel $f_{1c}$ sent from the base station (BS (base station)-1) 3, but either cannot receive the radio signal on control channel $f_{2c}$ from the base station (BS-2) 5 in the service area B2 or else the received level is below the level which allows a call to be made. For this reason, mobile station 4 goes into the receive-wait condition on the control channel $f_{1c}$ from base station 3. Should an emergency call request occur at this point, the emergency call request sent from the mobile phone 4 would pass via the base station 3 to the emergency call switchboard 8, during which time an emergency call circuit is formed.

After the completion of the above-noted emergency call, in the case in which the mobile telephone 4 moves to point P2, which is at a position at which service area A1 overlaps with service area B2, at this point P2, the radio signals from both the above-noted control channel $f_{1c}$ from the base station 3 and the above-noted control channel $f_{2c}$ from the base station (BS-2) 5 can be received at a received field strength greater than the threshold level. In this condition, if the mobile telephone 5 captures the control channel $f_{2c}$ and goes into the receive-wait condition, because the emergency call switchboard 8 still has not disconnected the emergency call circuit with the mobile telephone 4, if the emergency service operator recalls the above-noted mobile telephone 4, the recall will not succeed.

Therefore, even in the above-noted case, to allow the recall to succeed, according to the present invention, the mobile telephone 4 which has made an emergency call stores the system code which identifies the base station 3 at the time of the emergency call, and until the emergency call circuit is disconnected at the emergency call switchboard 8, it continues to capture the control channel of base station 3 which corresponds to that system code. In the condition in which the mobile telephone 4 has not verified the disconnection of the emergency call circuit, if its local power supply is switched off, the above-noted system code is stored in memory, and when the power supply is switched on once again the control channel $f_{1c}$ of the base station 3 to which the emergency call was made is captured, based on the thus held system code, the receive-wait condition on that channel being continued by the mobile telephone 4 until verification of the resetting of the above-noted emergency call circuit.

Figure 2:
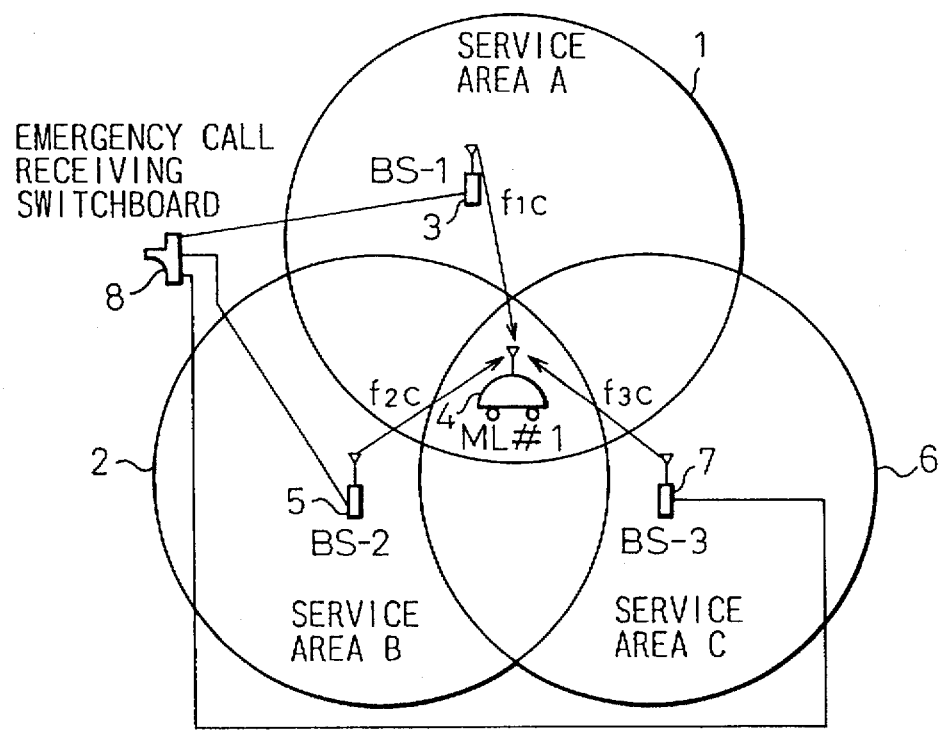
FIG. 2 is a drawing which shows an example of the configuration of a different service area applied to an emergency call control method according to the present invention.

FIG. 2 shows an example of the configuration of a different service area to which the present invention is applied. In FIG. 2, elements which are the same as in FIG. 1 are assigned the same reference symbols.

In FIG. 2, the mobile telephone 4 is positioned in a region in which there are three service areas, A 1, B 2, and C 6, and it is possible to make a call within any of these three service areas. If an emergency call is not in progress, should any of the control channels $f_{1c}$ to $f_{3c}$ being sent by base station 1, 5, or 7, respectively, in the service areas 1, 2, and 6, be captured, the mobile telephone 4 will go into the receive-wait condition.

If an emergency call request is generated at mobile telephone 4, mobile telephone 4 selects the control channel at that point having the highest received field strength, and makes an emergency call to the base station having that control channel, thereby forming an emergency call circuit. If the current relationship between the received field strength levels of the control channels $f_{1c}$ to $f_{3c}$ is $f_{1c}<f_{2c}<f_{3c}$, the emergency call circuit will be formed through the path mobile telephone 4→base station 3→ emergency call switchboard 8. As described above, after the emergency call, to enable a recall from the emergency call switchboard 8 to the mobile telephone 4 to succeed, it is necessary to maintain the radio circuit between the base station 3 and the mobile telephone 4.

In this case, similar to the case shown in FIG. 1, after the emergency call, the above-noted mobile telephone 4 continues to capture the control channel of base station 3 which was selected when the emergency call was made until the switchboard 8 disconnects the emergency call circuit, and control is performed so that only after verification that the emergency call circuit has been disconnected by the switchboard 8, is capture started of the control channels of other base stations. That is, the mobile telephone 4 stores the system code of the base station 3 that was used in making the emergency call, and until the emergency call circuit is disconnected from the emergency call switchboard 8, the control channel $f_{1c}$ of the base station 3 which is sending this system code is captured, thereby going into the receive-wait condition, and if there is a request for a normal call, the above-noted control channel $f_{1c}$ is used to send the call.

Figure 3:
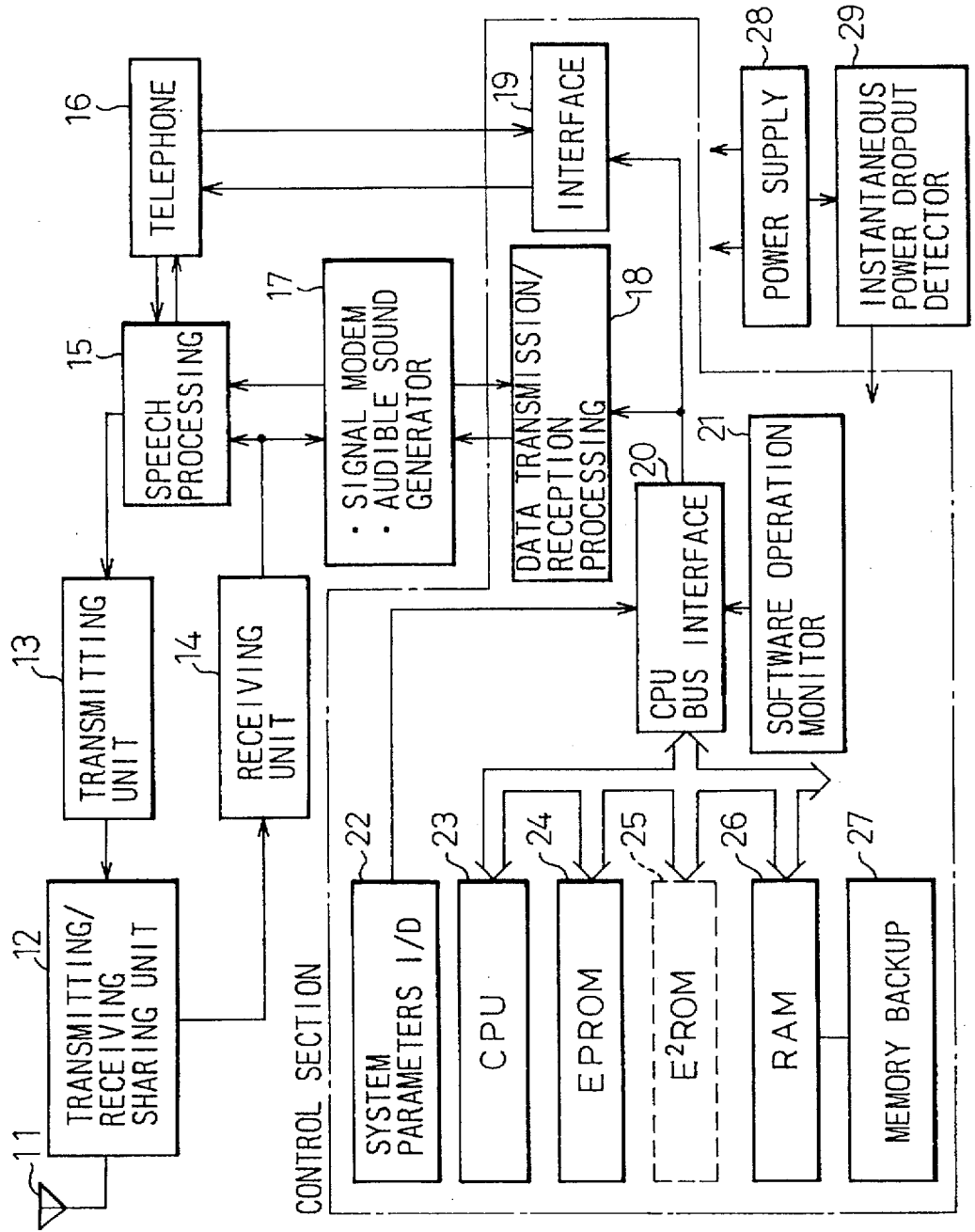
FIG. 3 is a block diagram which shows an example of an apparatus of a mobile telephone related to the present invention.

FIG. 3 is a block diagram which shows an example of the configuration of the apparatus of a mobile telephone.

In FIG. 3, the speech signal from a handset or the like is communicated with the base station via a telephone circuit 16, a speech processing unit 15, a transmitting unit 13, a receiving unit 14, and an antenna 11. The signaling signal of the telephone is processed by the data transmitting/receiving processing unit 18, is converted to the required signal by the signal modem circuit 17, and is communicated to the base station in the same manner as the speech signal via the antenna 11. Furthermore, in this example, the block denoting the above-noted signal modem circuit 17 includes an audible-sound generating circuit.

The control section of the telephone is formed by a general-purpose microprocessor circuit, this control section including CPU 23, EPROM 24, into which are stored the telephone program, parameters, and the like, an overwritable EEPROM 25, into which is stored system codes, telephone control parameters and the like, and a RAM 26. The control section of the telephone controls the data transmitting/receiving processing unit 18 and telephone circuit 16, via the CPU bus interface circuit 20. When the instantaneous power dropout detection circuit 29 detects a power dropout, it resets the above-noted control section of the telephone.

Figure 4:
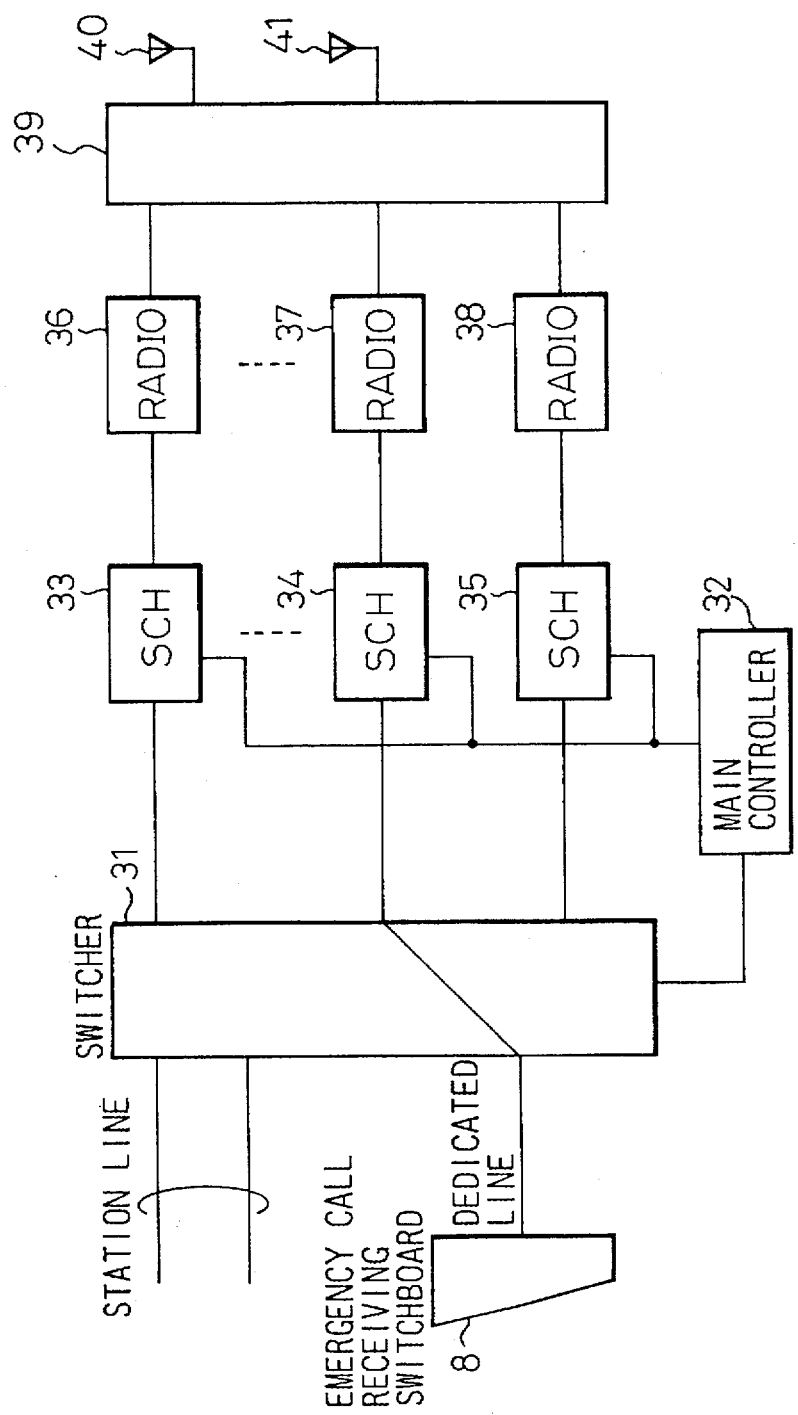
FIG. 4 is a block diagram which shows an example of the apparatus of a base station related to the present invention.

FIG. 4 is a block diagram which shows an example of the system configuration at the base station.

In FIG. 4, the base station has a transmitting antenna 40 and receiving antenna 41 for the purpose of transmitting and receiving, which are shared by a plurality of radio transceiver units (Radio) 36 to 38 by means of an antenna sharing unit 39, speech channel unit (Sch) 33 and 34, which control the speech channel, and a control channel unit (Cch) 35, which controls the speech channel, the above-noted speech channel units 33 and 34 and the control channel unit 35 being controlled in common by a main controller 32. The speech signals from the above-noted speech channel units 33 and 34 are connected to the emergency call receiving switchboard 8 or the like via the prescribed station circuit or dedicated line.

FIGS. 5 through 15(B) show an example of the control operation flow in the mobile telephone. These drawings will be referred to below in relation to a description of the present invention.

Figure 5:
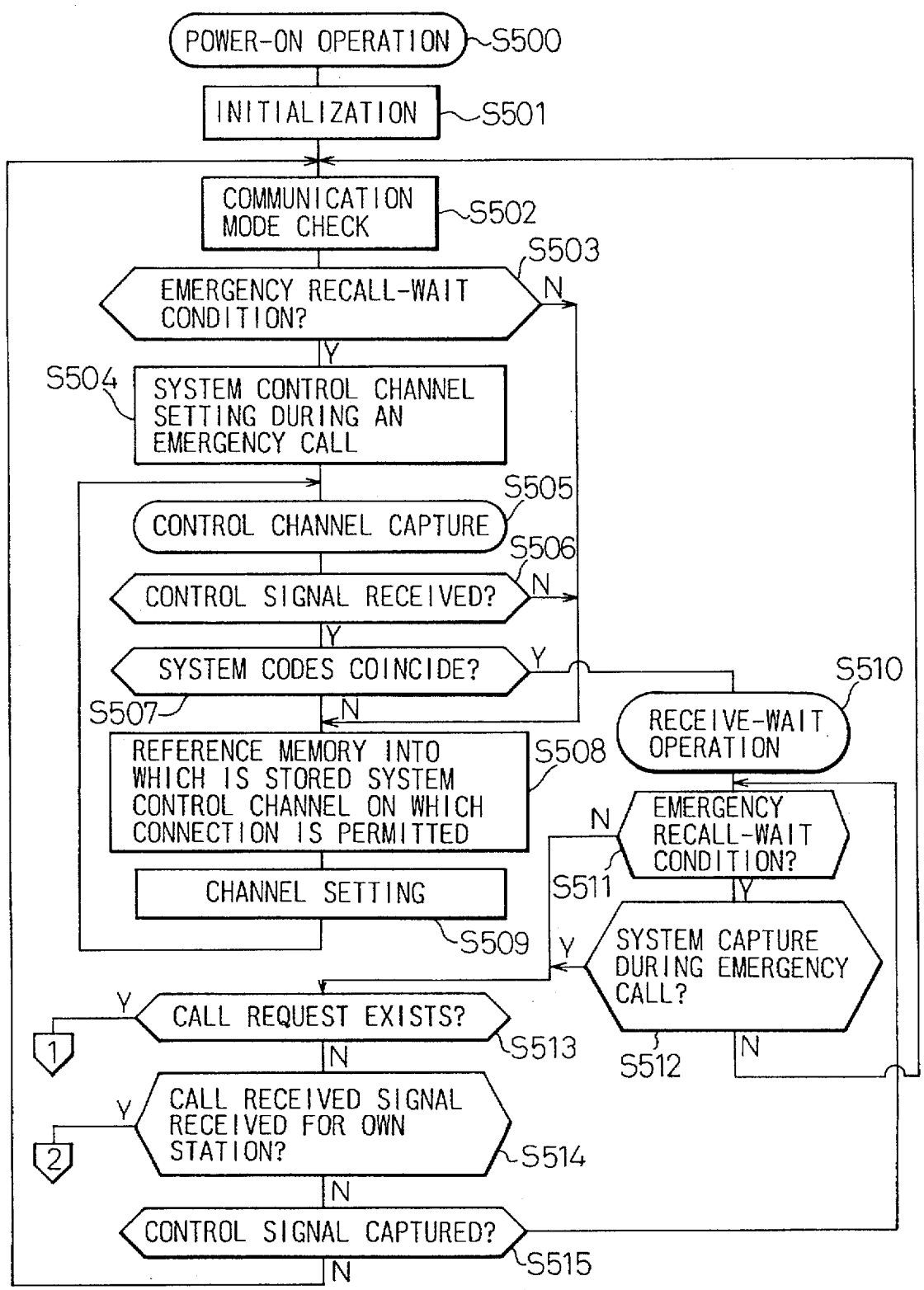
FIG. 5 is flowchart (1) which shows an example of the control operation in a mobile telephone.
Figure 7:
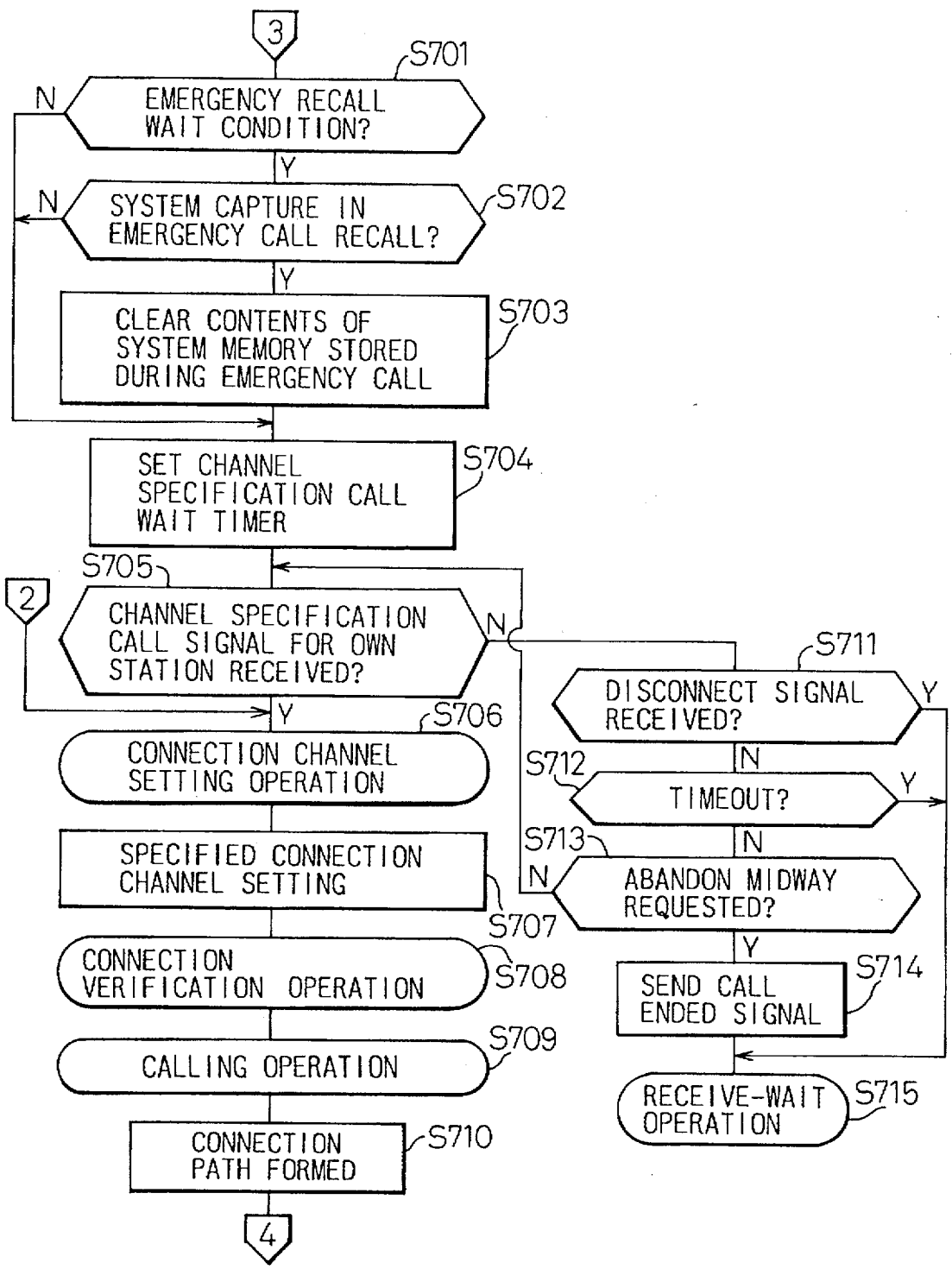
FIG. 7 is flowchart (3) which shows an example of the control operation in a mobile telephone.

By way of description of the above in terms of the control flow of the mobile telephone as shown in FIG. 5 and FIG. 6(B), first in FIG. 5, the initialization operation is started when power is applied (step S501), and at step S503 a test is made as to whether the mobile telephone is in receive-wait for an emergency call recall. If an emergency call is in progress, the control channel capture operation is executed (steps S504 to S509). When the system code of the base station is detected at the time of an emergency call, the mobile telephone goes into the recall receive-wait condition (steps S510 to S515).

In FIGS. 6(A) and 6(B), in the case in which the mobile telephone is in the emergency call recall receive-wait condition or cannot accept a call, it goes into the receive-wait condition (steps S604 to S607). In the case of a new emergency call, that is, in a case other than the recall-wait condition, the optimum service area is selected, the control channel having the maximum received field strength is set, the operation of capturing the above-noted channel is performed, and a call signal is sent by means of coincidence of the system code (steps S616 to S620 and step S608). Next, at step S610 the response signal sent to this mobile telephone is detected, and in the case in which, for example, the emergency call receiving switchboard 8 has not, as described above, released the emergency call circuit which had been formed, so that a call refusal signal or disconnect signal is received from the base station, the mobile telephone 4 goes into the receive-wait condition (steps S612 and S623).

There are cases in which the power supply of the mobile telephone is switched off after the completion of an emergency call. Even in such cases, to enable recalling from the emergency call receiving switchboard 8 after power is switched on once again, a means is needed for storing the system code of the base station, which was captured at the time of the emergency call, so that it is not erased. To do this, a battery backed-up RAM (denoted by reference numerals 26 and 27 in FIG. 3) or an electrically erasable non-volatile memory (denoted by reference numeral 25 in FIG. 3) is used.

In addition, to assure that the mobile telephone 4 reliably captures the control channel $f_{tc}$ of the base station which is used at the time of the emergency call, the base station system code contents which are stored by the above-noted system code storage means at the time of the emergency call must be guaranteed. To achieve this, according to the present invention, a coding error check code, such as a parity check code or CRC, is added to the system code to prevent corruption of the storage of the system code due to misoperation of the main control CPU or peripheral circuits when the power supply is switched on or off. When the above-noted system code is read out, a coding error check is performed, the capture of the control channel flc being performed by reading out the above-noted system code only if verification is achieved that the system code is normal. By doing this, it is possible to accurately capture the base station 3 to which the emergency call was issued after the emergency call is completed.

Figure 20:
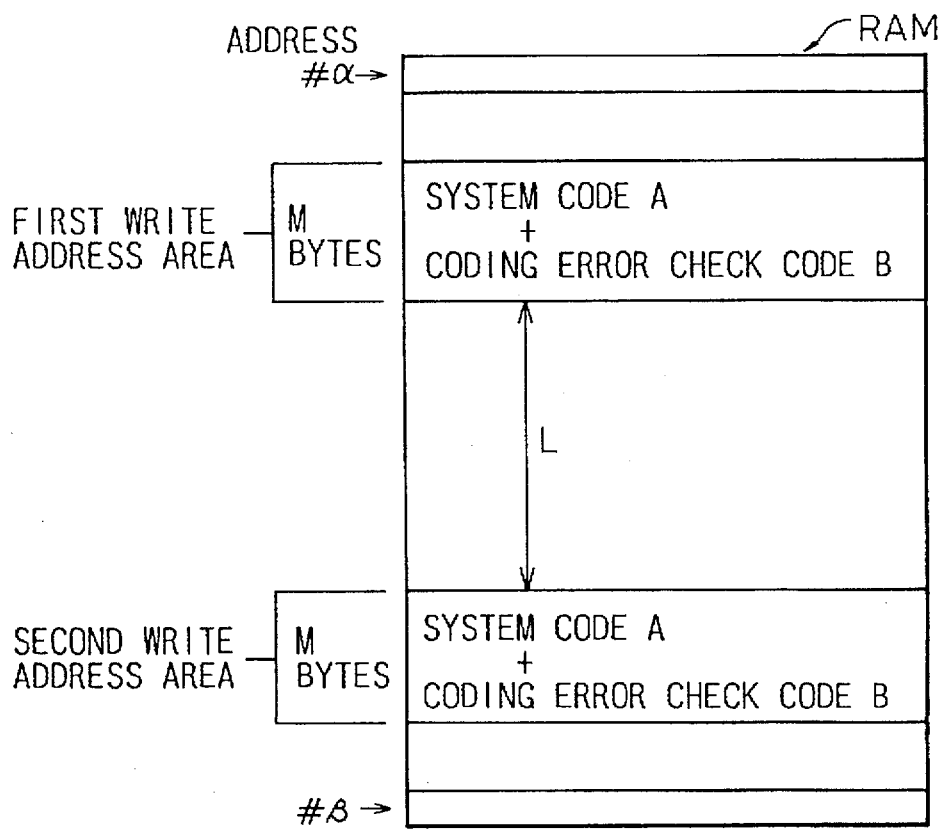
FIG. 20 is a drawing which shows an example of the method of writing the system code according to the present invention.

FIG. 20 shows an example of the method of writing the system code at the time of the emergency call into memory. The writing of the system code shown in FIG. 20 is performed with the assumption that the above-noted error detection result was abnormal, and after the above-noted memory processing and error correction processing are performed, the same data (system code A and coding error check code B) are written into two locations, the first write address area and the second write address area of a battery backed-up RAM or electrically overwritable non-volatile memory.

Figure 21:
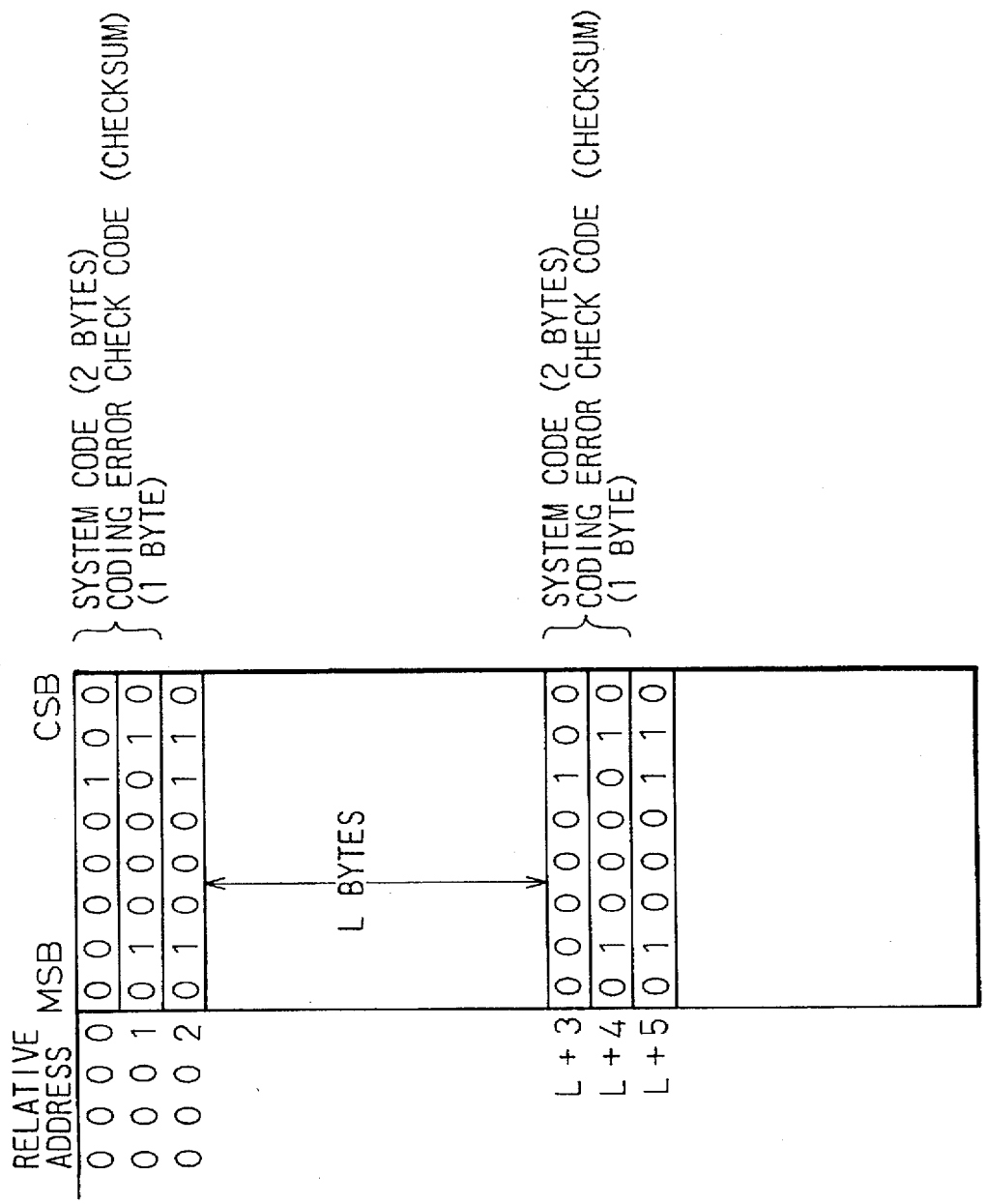
FIG. 21 is a drawing which shows a specific example of data in the memory shown in FIG. 20.

FIG. 21 shows a specific example of the data in the memory of FIG. 20. In FIG. 21, two bytes are used for the system code, the exclusive OR of corresponding bits in each above-noted byte being used as the coding error check code.

Figure 19:
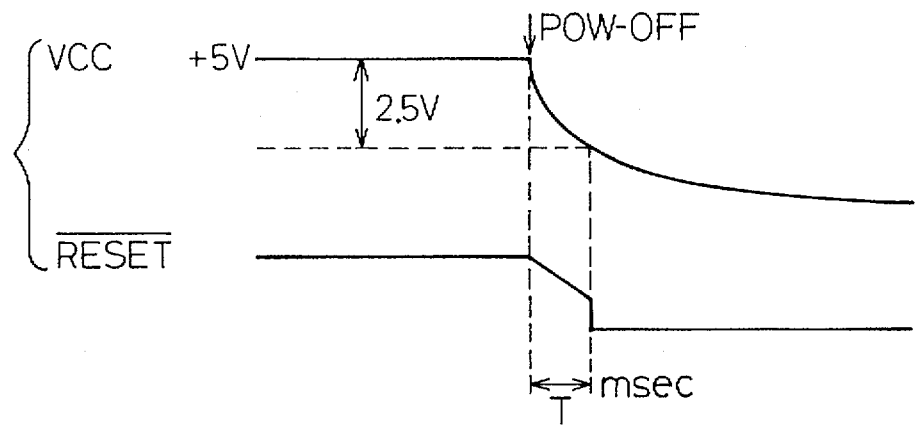
FIG. 19 is a drawing which shows an example of the change in output of a reset circuit with respect to the power supply voltage when the power supply is turned off.

FIG. 19 shows an example of the change in output of a reset circuit with respect to the power supply voltage when the power supply is turned off. At the point at which the +5 V power supply voltage shown at (a) of FIG. 19 drops to +2.5 V, the reset circuit output shown at (b) of FIG. 19 detects the reset ON condition, a time T, of several milliseconds, being required from the time the power supply is switched off until the reset is detected. Considering that, during the above-noted reset time T, the operation of the CPU is not guaranteed and there is a danger of corruption of the memory contents, as shown above with regard to FIG. 20, the system code of the base station 3 at the time of the emergency call is stored in two locations in memory, the first write address area and the second write address area, which are separated by an address distance of L. By doing this, even in the worst case, at least one of the system codes will be stored properly, thereby enabling prevention of erroneous writing of the system code when the power supply is being switched on or off.

The above-noted address distance L between the first write address and the second write address is established by the following relationship.

$$L > (T/W) \tag{1}$$

In the above, T is the delay time from the point at which the power is switched off to the point at which the CPU reset circuit operates, and W is the execution time for the write command in the control program.

Figure 9:
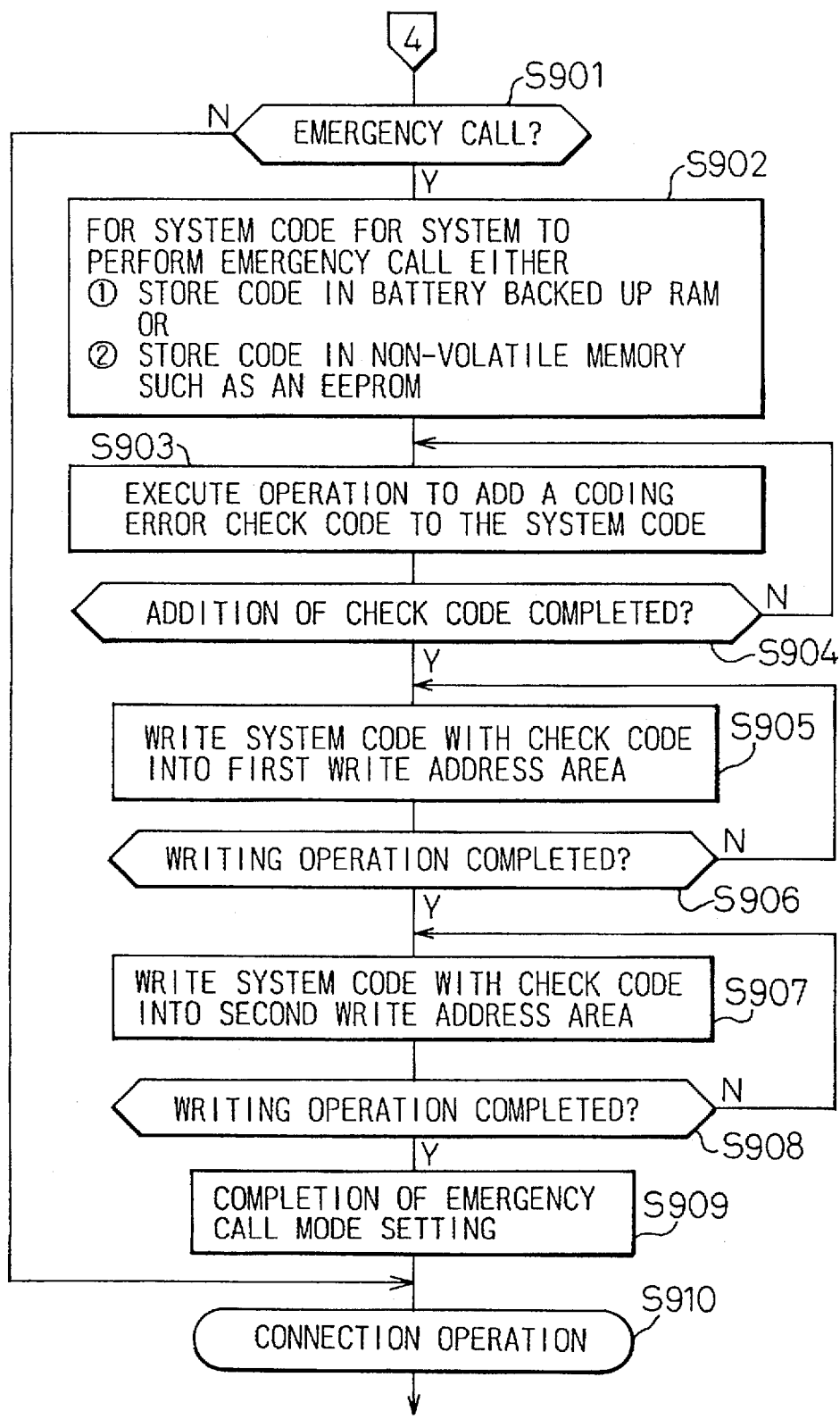
FIG. 9 is flowchart (5) which shows an example of the control operation in a mobile telephone.

FIG. 9 shows an example of the control flow for the above-noted writing of the system code and the associated check code into memory.

In FIG. 9, in the case of an emergency call (step S901), the system code of a base station to which an emergency call was issued, and the associated coding error check code are written into two locations in RAM or EEPROM non-volatile memory, i.e., the first write address area and the second write address area (steps S902 to S909).

Figure 10:
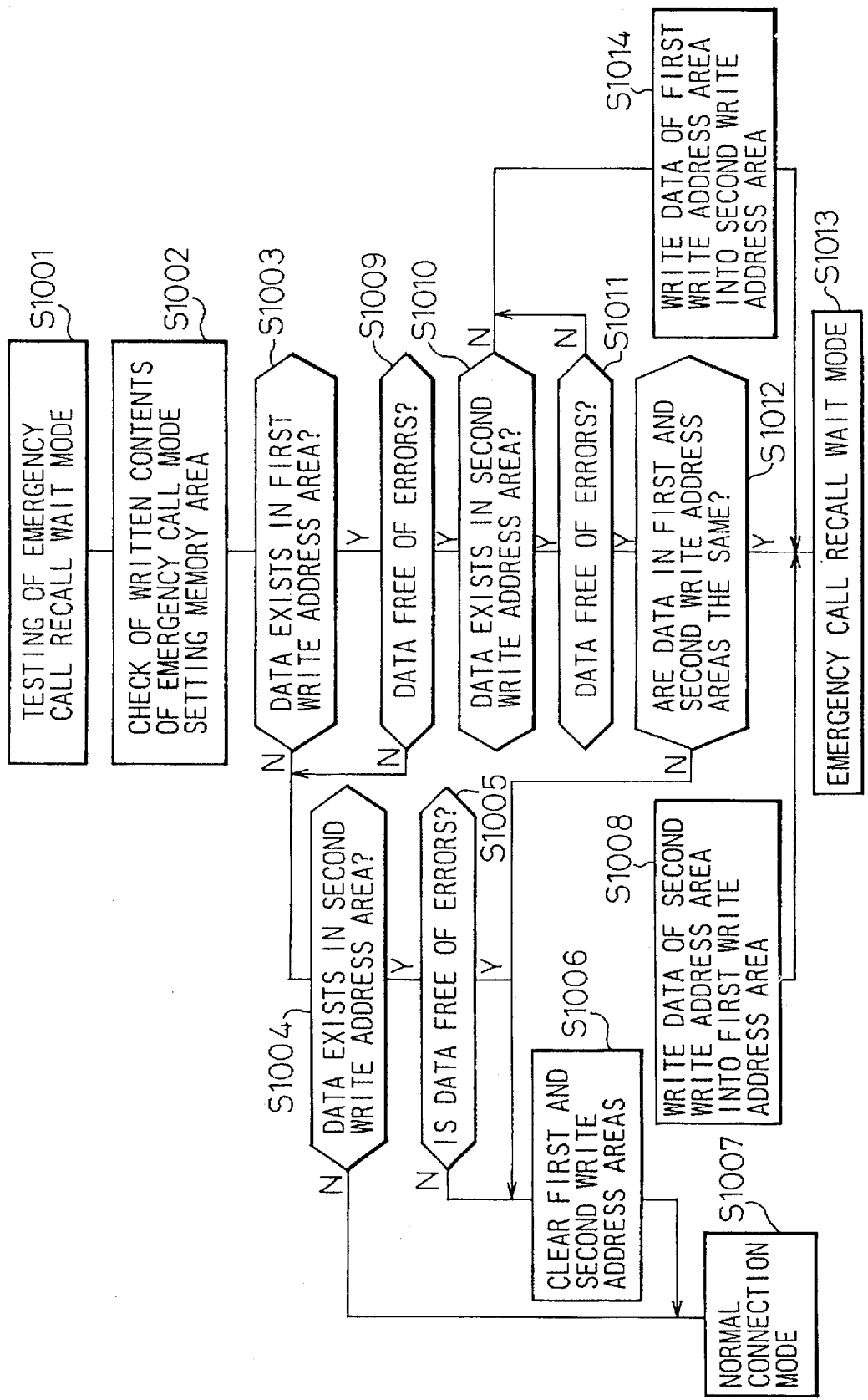
FIG. 10 is flowchart (6) which shows an example of the control operation in a mobile telephone.

FIG. 10 shows an example of the control flow for the readout of data from the above-noted two locations, and maintenance.

In FIG. 10, of the system codes written into the first write address area and the second write address area, a coding error detection is first performed on the data stored in the first write address area. If the result of this data detection is normal, a data coding error detection is performed in the same manner on the data stored in the second write address area, and if the result is again normal and also the data in the two areas coincide, this data is taken to be normal (steps S1003, and S1009 to S1013). If the result of the detection is normal for the data in the first write address, but the detection result for the data in the second write address is abnormal, the data in the first write address is used, the data in the second write address area being overwritten with that data (steps S1011 and S1014).

In addition, if the result of the detection is abnormal for the data in the first write address, but the detection result for the data in the second write address is normal, the data in the second write address is used, the data in the first write address area being overwritten with that data (steps S1009 and S1008). In the case in which the data in both the first and the second write address areas are abnormal, the data in the two write address areas are cleared (step S1006). In this manner, in the case in which data in both write address areas are normal and mutually coinciding, or in which the data in one of the locations is normal, after the completion of the emergency call, the mobile telephone 4 goes into the mode in which it waits for a recall from the emergency call receiving switchboard 8.

Next, the case in which the emergency call receiving switchboard 8 disconnects the emergency call circuit with the mobile telephone 4, over which the emergency call was made, and the judgment is made by the above-noted mobile telephone 4 that it has been released from the recall receive-wait condition, will be described.

Figure 8:
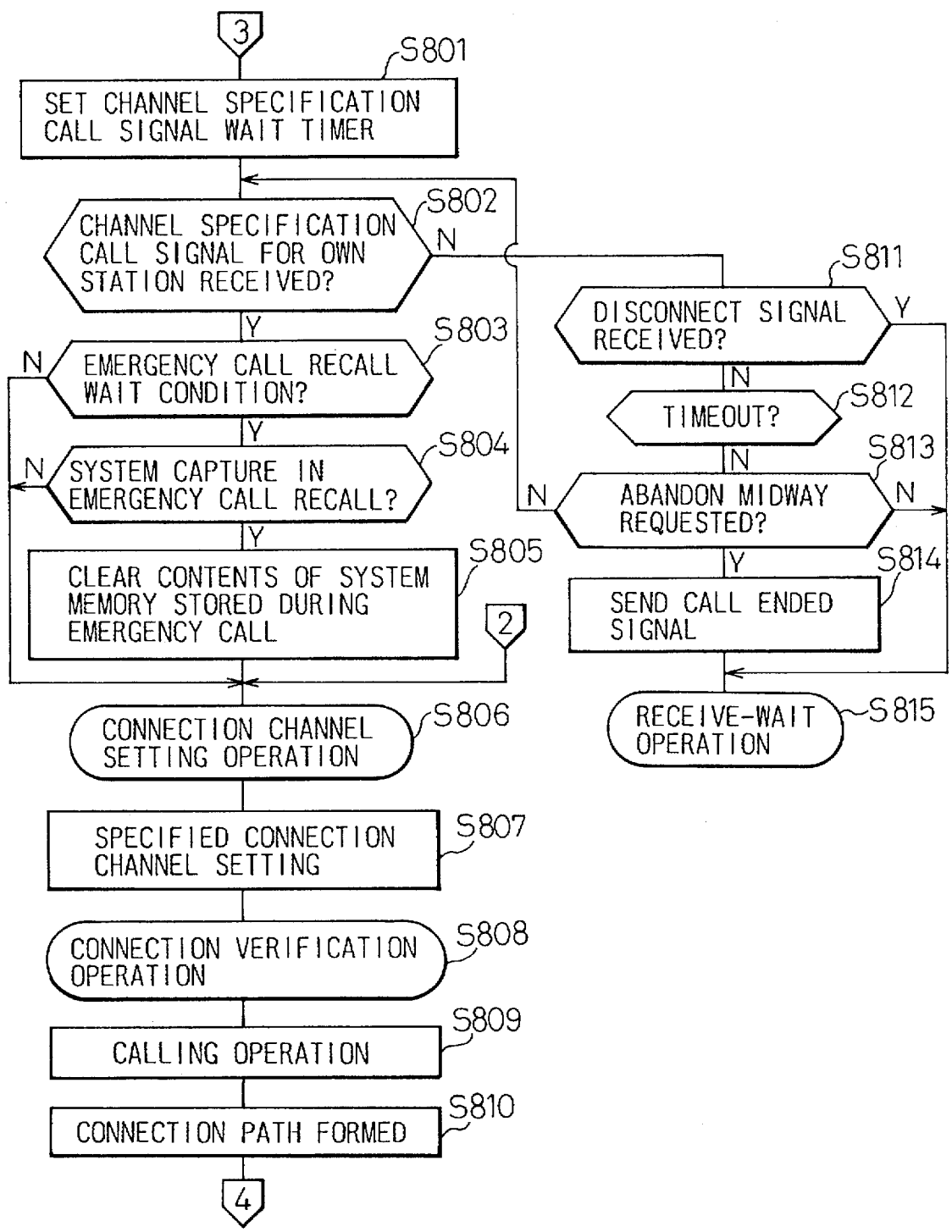
FIG. 8 is flowchart (4) which shows an example of the control operation in a mobile telephone.

When the mobile telephone 4 performs a calling operation via the control channel flc of the base station, which was captured for the purpose of use in the recall receive-wait condition, if a response other than a call refusal signal is received with respect to this call from the base station 3, the mobile telephone 4 takes this to indicate that the emergency call circuit has been disconnected. The mobile telephone 4 then erases from memory the system code of base station 3 which had been stored in memory for the purpose of the emergency call, and goes into the normal receive-wait condition for normal calling and receiving. As shown in the control flow of FIG. 7, when the mobile telephone receives a response signal directed to it (step 610), a test is made as to whether or not this is a response signal for recall wait for an emergency call, and if it is, the judgment is made that the emergency call receiving switchboard 8 has disconnected the emergency call circuit that had been formed, and the memory contents related to the emergency call are cleared (steps S701 to S703), after which the normal call connection flow is executed (steps S706 to S710). The above-noted normal call connection flow is similar to the case in FIG. 5, in which the mobile telephone receives an incoming call signal directed at it when it is in the normal receive-wait condition (step S514). Because FIG. 8 is the same as FIG. 7, with the exception that the point at which a test is made as to whether a channel-specification call signal for the mobile telephone has been received (step S802) is earlier than in the case of FIG. 7 (step S707), it will not be described in further detail herein.

Another method other than the method first described, in which the mobile telephone 4 selects the base station called at the time of an emergency call, is that of using one of the captured base station control channels at the time an emergency call request is generated to send an emergency call signal to, for example, the police or fire department. By means of this method, the initial control operations of the mobile telephone 4 when the emergency call is made are simplified.

Figure 11:
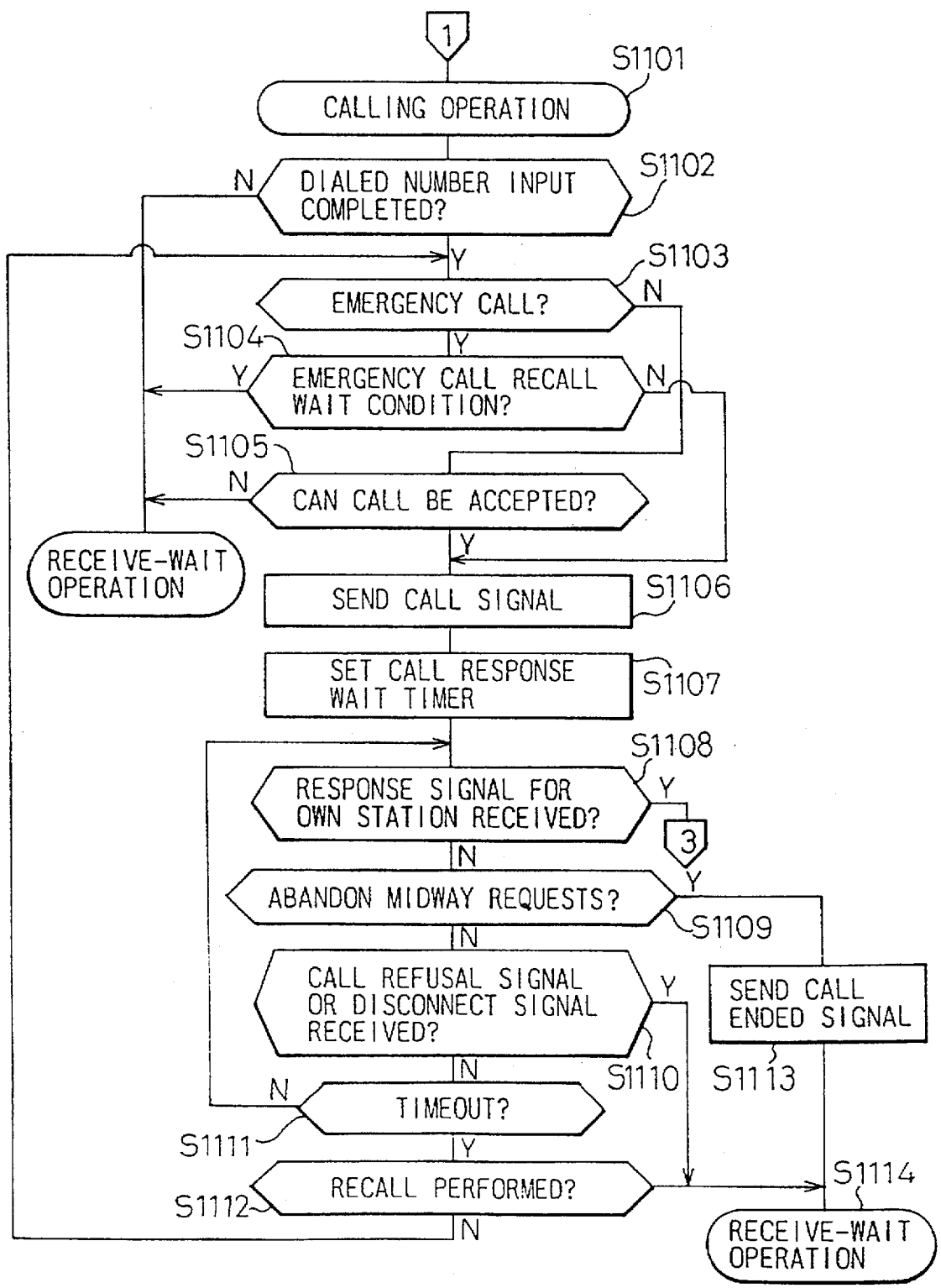
FIG. 11 is flowchart (7) which shows an example of the control operation in a mobile telephone.
Figure 13A:
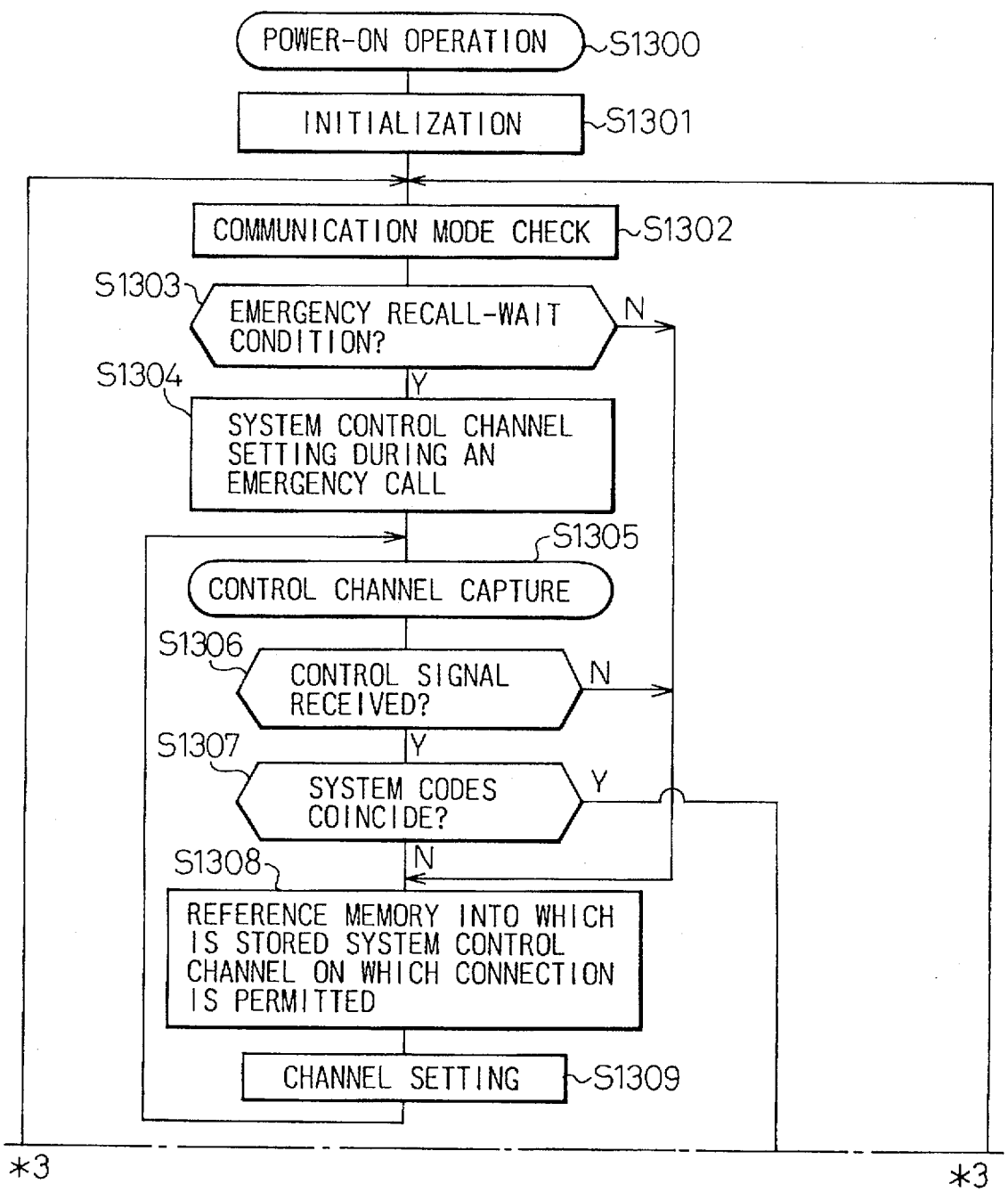
FIG. 13(A) is flowchart (9-1) which shows an example of the control operation in a mobile telephone.
Figure 15A:
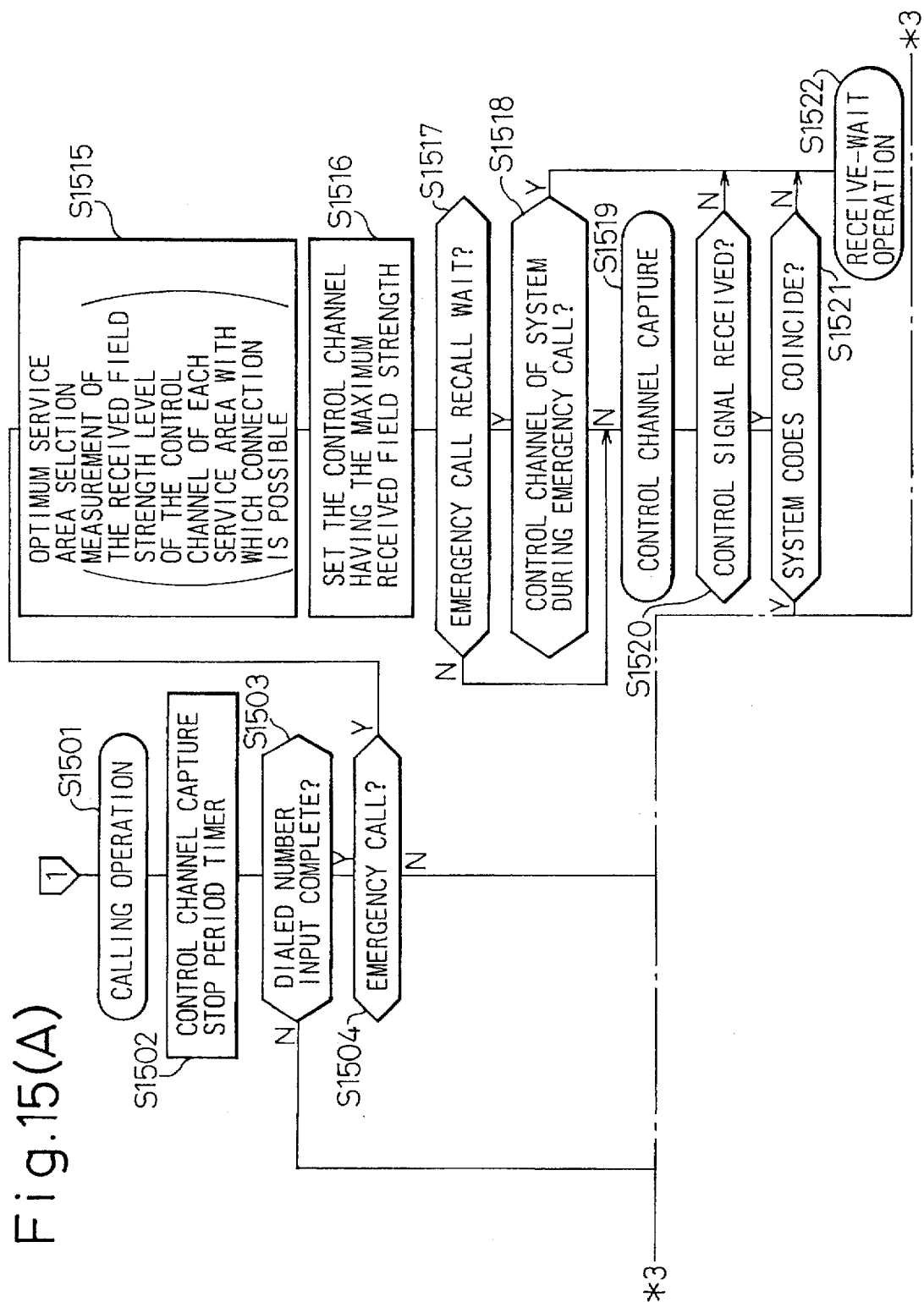
FIG. 15(A) is flowchart (11-1) which shows an example of the control operation in a mobile telephone.
Figure 15B:
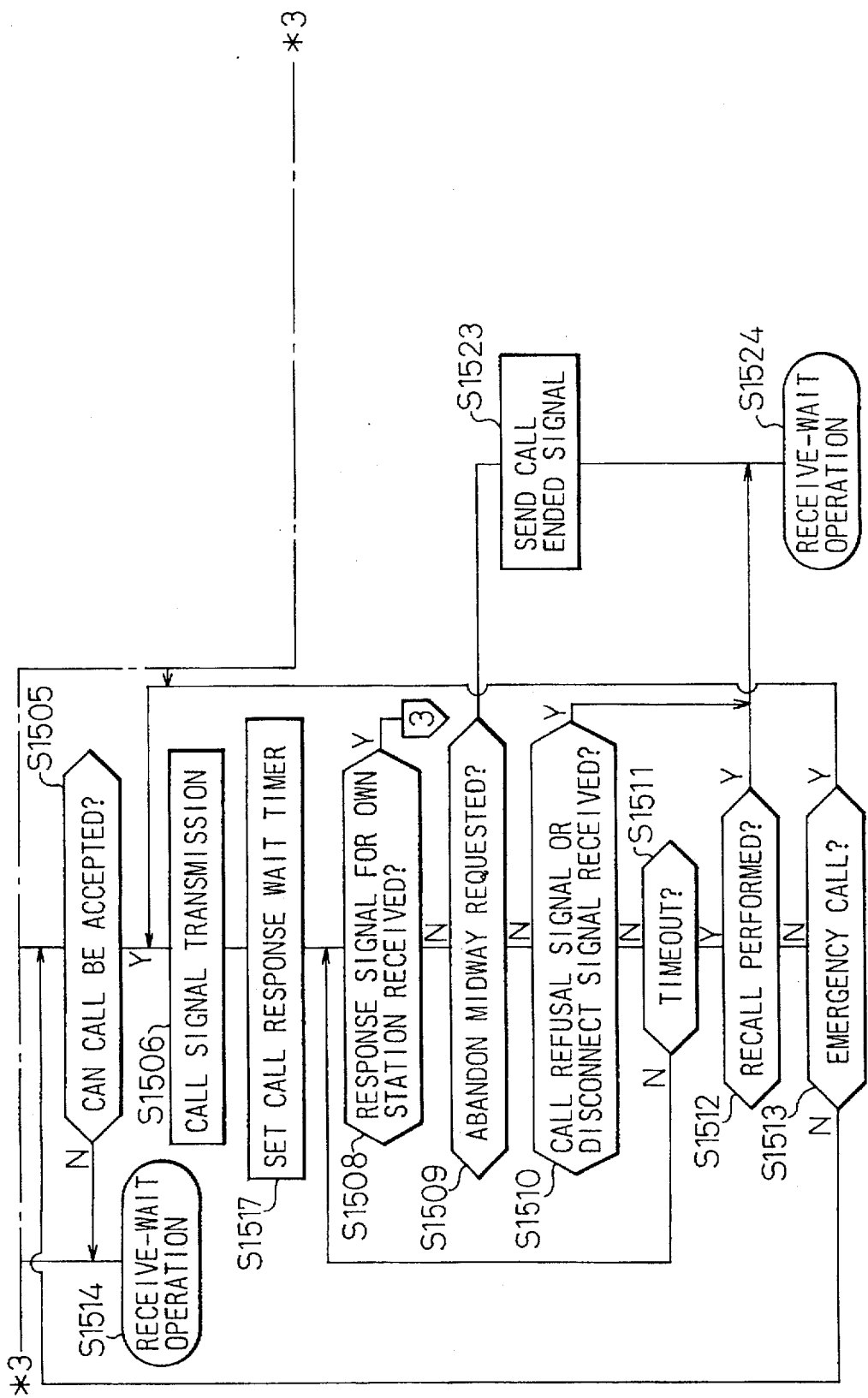
FIG. 15(B) is flowchart (11-2) which shows an example of the control operation in a mobile telephone.
Figure 16:
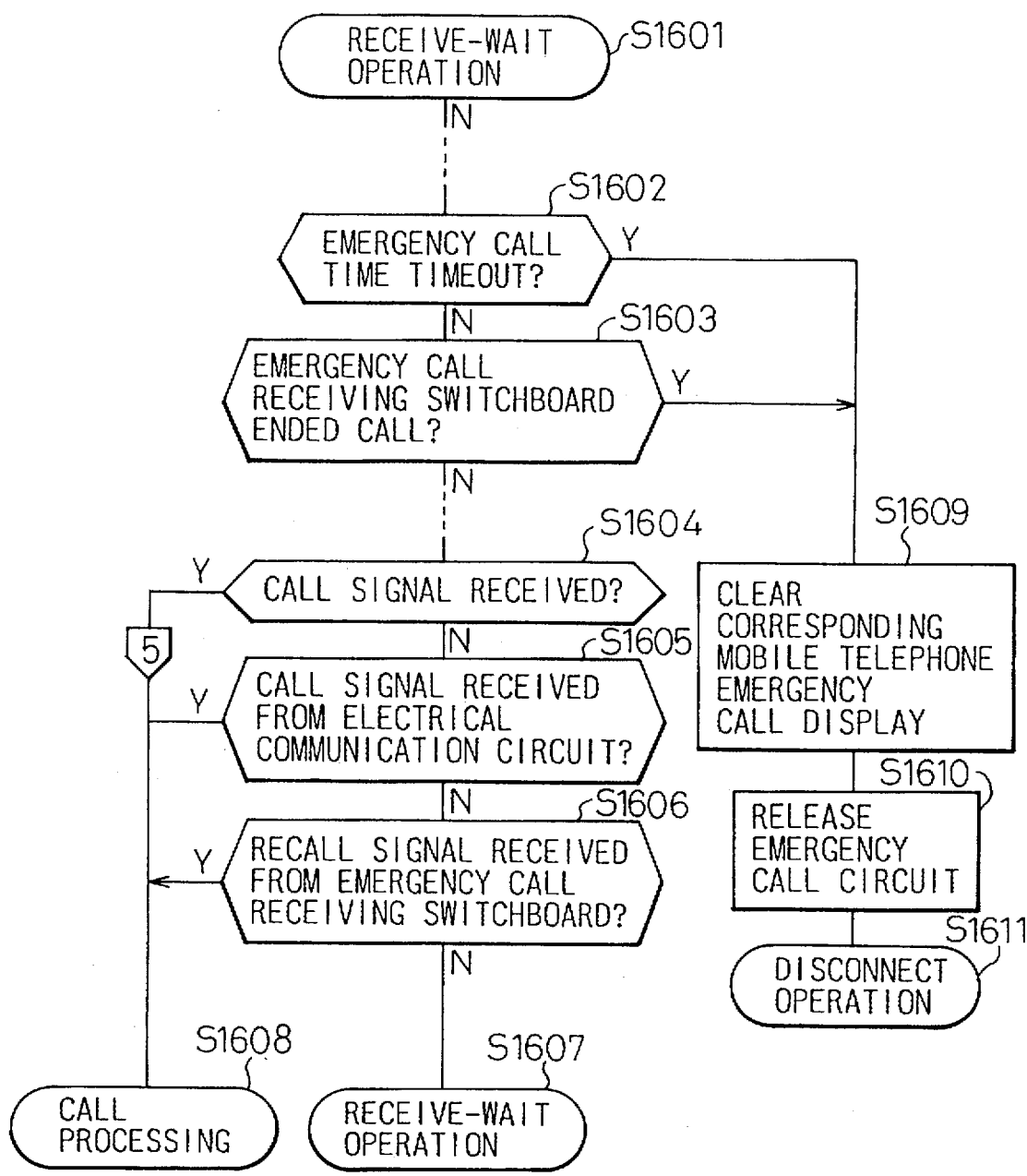
FIG. 16 is a flowchart (1) which shows an example of the control operation in a base station.
Figure 17:
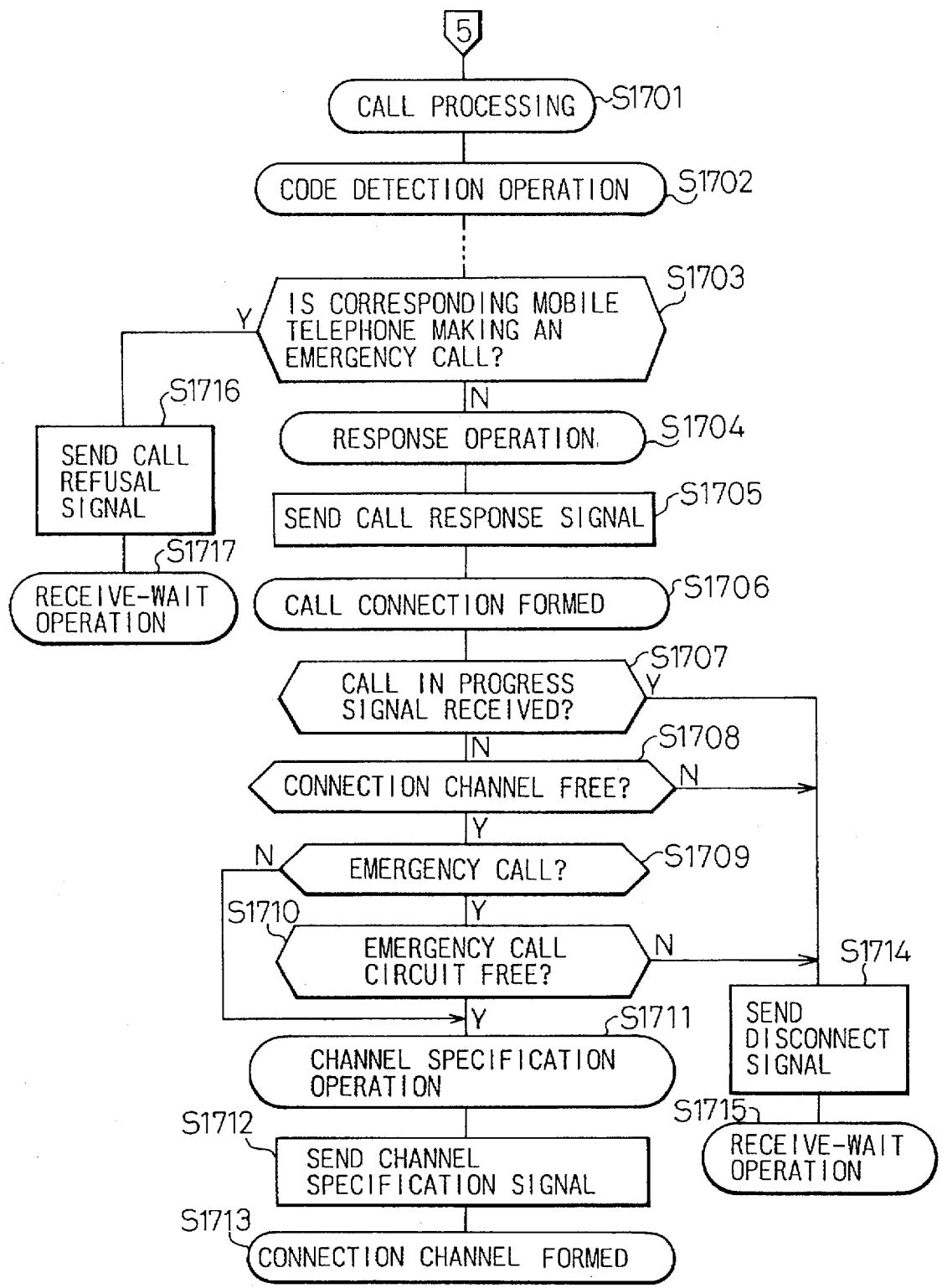
FIG. 17 is a flowchart (2) which shows an example of the control operation in a base station.
Figure 18:
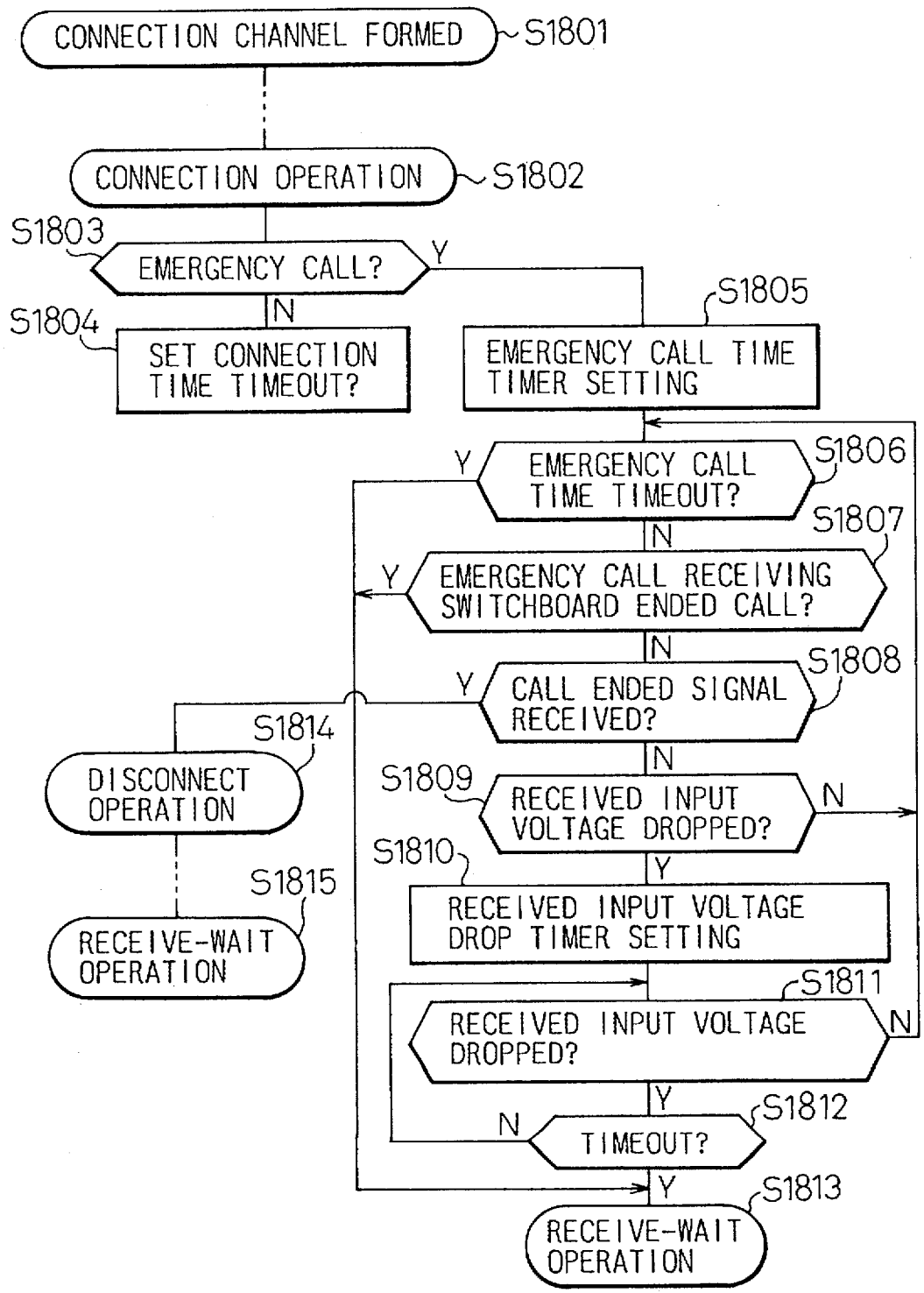
FIG. 18 is a flowchart (3) which shows an example of the control operation in a base station.

FIG. 11 shows an example of the control flow for the above-noted method. In comparing FIG. 11 with the previously described FIGS. 6(A) and 6(B), because the flow corresponding to steps S616 to S620 in FIG. 6(A) become unnecessary, it can be seen that, as stated above, the control operations are simplified.

Yet another method is that of setting the system codes (station identification codes) of base stations of the service areas used when making emergency calls into the mobile telephone 4 beforehand, with emergency calls being made via the control channels of the base stations in service areas corresponding to these system codes. The above-noted mobile telephone 4 stores the fact that an emergency call has been made, so that when a call is made next after the completion of the emergency call, the normal call signal is sent by using a control channel of a service area which was set beforehand for use in emergency calls.

FIGS. 12(A) and 12(B) show an example of the control flow for the above-noted method. Similar to the case method shown in FIG. 11, when FIGS. 12(A) and 12(B) are compared the method previously described with reference to FIGS. 6(A) and 6(B), it can be seen that the steps S616 and S617 are simply replaced in this method, as shown by step S1215 in FIG. 12(A), by the processing which selects a system code preset in memory.

Figure 22:
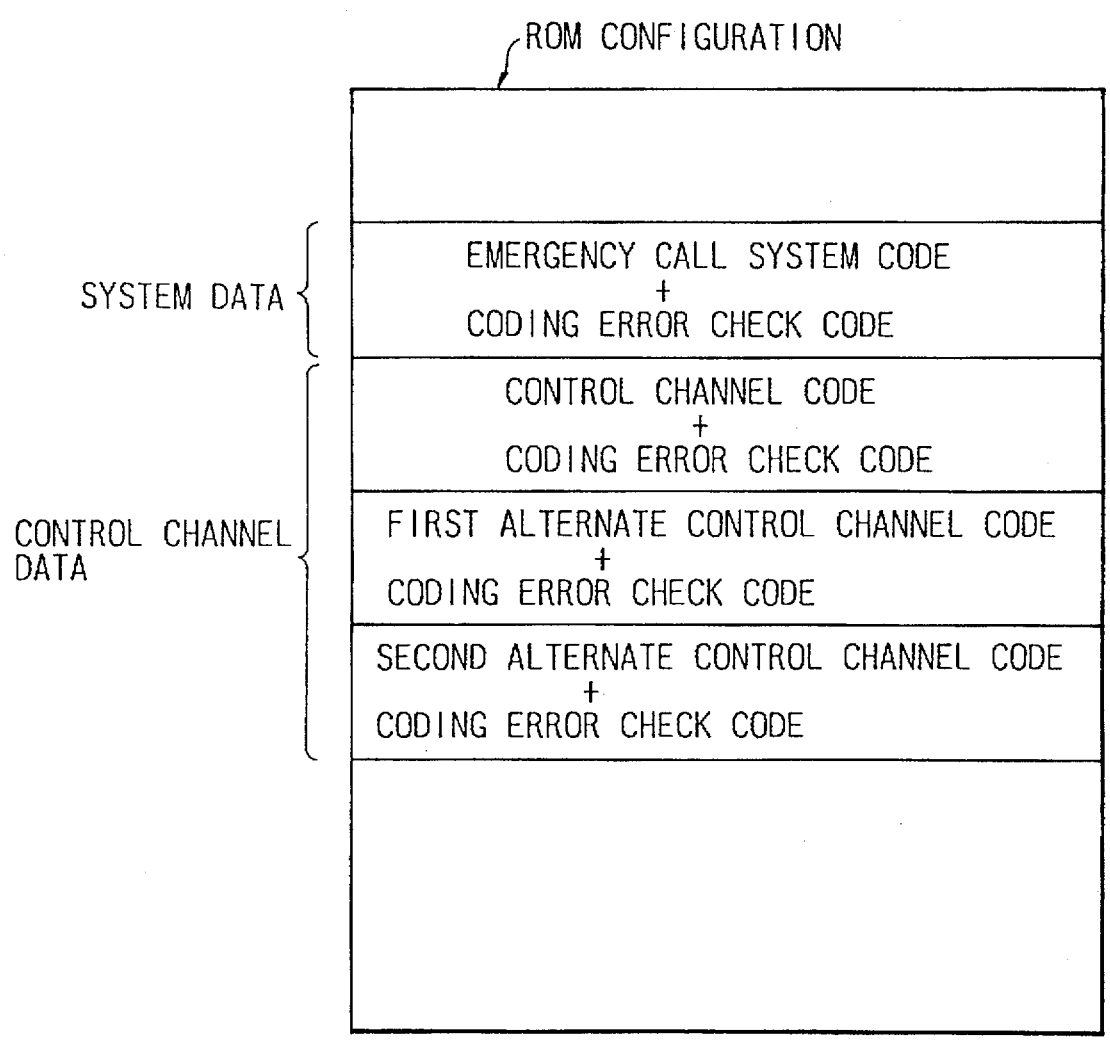
FIG. 22 is a drawing which shows an example of an emergency call base station identification code format which has been written into ROM.
Figure 23:
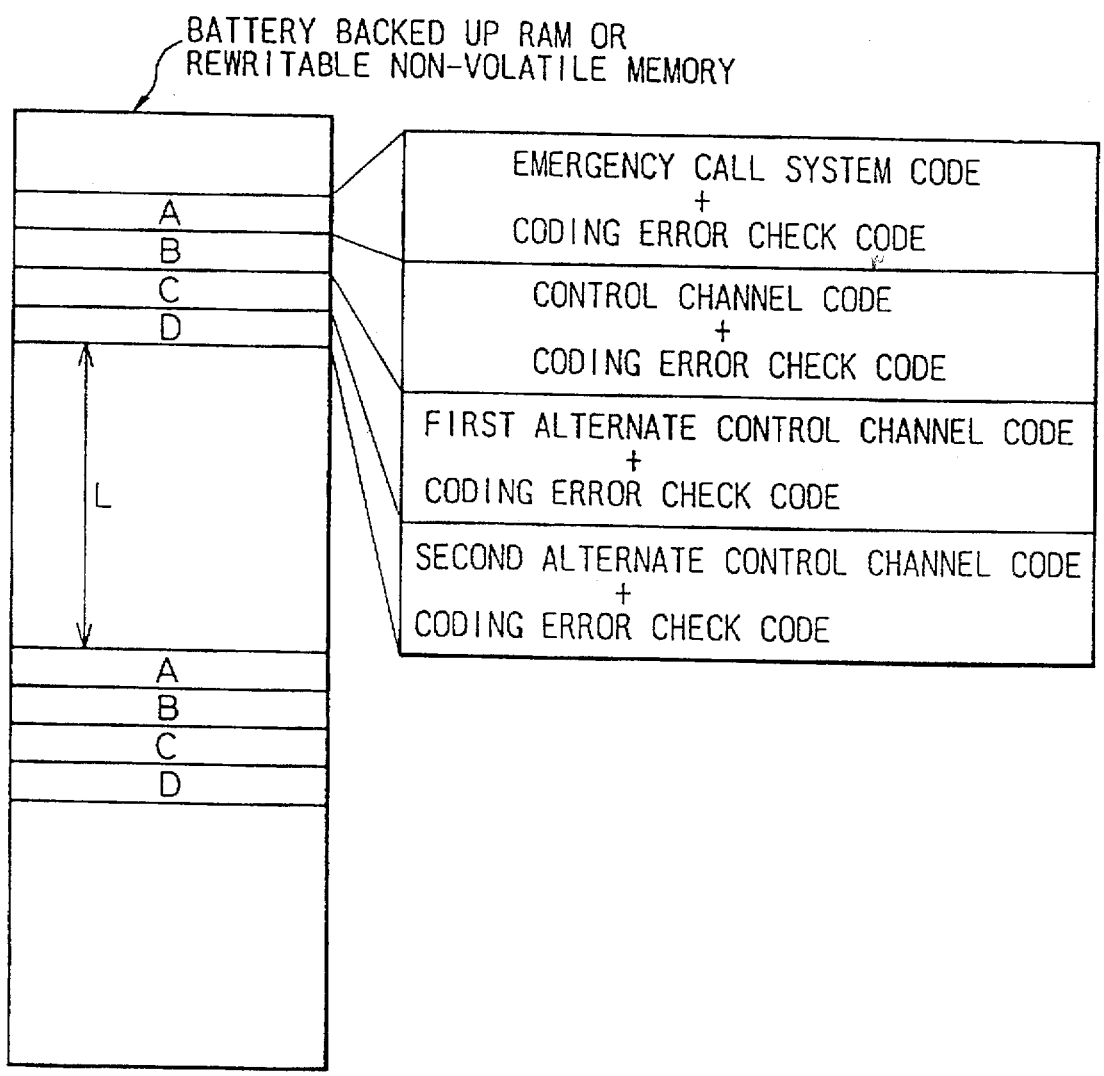
FIG. 23 is a drawing which shows an example of the emergency call system code memory map in RAM.

FIG. 22 shows an example of an emergency call base station identification code format which has been written into ROM. FIG. 23 shows an example of the emergency call system code memory map in RAM.

Even in the additional methods described above, in setting emergency call base station identification codes into the mobile telephone beforehand, it is possible to write data into two locations in ROM, separated by an address distance L, in ROM as shown in the above-noted FIG. 22, or in battery backed-up RAM or overwritable nonvolatile memory, as shown in FIG. 23. In this case as well, L satisfies the relationship given as Equation 1.

FIGS. 16(A) to 18 show an example of the control flow in a base station, these drawings being referred to below in describing the base station.

The control apparatus of the base station 3 which has received an emergency call forms an emergency call circuit between the emergency call receiving switchboard 8 and the mobile telephone, after which it monitors the disconnection of the emergency call circuit by the emergency call receiving switchboard 8 (steps S1602 and S1603). After the disconnection of the emergency call circuit, if a recall signal is received from the mobile telephone 4 that made the emergency call, the above-noted control apparatus of the base station 3 returns a call response signal to the mobile telephone 4, to notify the mobile telephone 4 that the emergency call circuit has been reset (steps S1604, and S1701 to S1705). On the other hand, if a recall signal is received from the mobile telephone 4, which made the emergency call, before the emergency call circuit is disconnected, the call refusal signal is returned, thereby notifying the mobile telephone 4 that the emergency call receiving switchboard 8 is in the hold recall receive wait condition (steps 1604, S1703, and S1716).

The conditions under which the control apparatus of the base station 3 causes resetting of the emergency call circuit include the case in which the emergency call circuit disconnect operation by the emergency call receiving switchboard 8 is detected (step S1603) and that in which a system-imposed call time limit from the time at which the emergency call circuit is formed has elapsed, for example, the case in which several hours have elapsed although the emergency call circuit has not been disconnected from the emergency call receiving switchboard 8 (step S1602). When either of these conditions is met, the control apparatus of the base station 3 causes resetting of the emergency call circuit, and performs re-allocation for the purpose of normal calls (steps S1609 to S1611).

Next, the service area configuration shown in FIG. 1 will be used to describe the case in which it is not possible to verify that the emergency call receiving switchboard has disconnected the emergency call circuit and in which the mobile telephone has moved into a different service area.

With the mobile telephone 4 at point P1, the emergency call circuit route is formed to the emergency call receiving switchboard 8 via the base station 3 in the service area A 1. The mobile telephone 4 subsequently moves to point P2, which is located so as to be able to receive both of the control channel radio signals at $f_{1c}$ and $f_{2c}$ sent from the base station 3 and the base station 5 with a received field strength level above a threshold. If at this point P2 it is not possible for the mobile telephone 4 to verify that the emergency call receiving switchboard 8 has disconnected the emergency call circuit, even if the existing emergency call circuit should be maintained, for example, even if the received field strength of $f_{1c}$ is smaller than that of $f_{2c}$, the mobile telephone 4 will use the control channel $f_{1c}$ of the base station 3 and go into the receive-wait condition.

However, if even after that if the mobile telephone 4 moves to the point P3 in the service area B 2 although is it is still not possible to verify that the emergency call receiving switchboard 8 has disconnected the emergency call circuit, mobile telephone 4 cannot receive the control channel radio signal on $f_{1c}$ from the base station 3, and can receive only the control channel signal on $f_{3c}$ from the base station 5. In this case, as shown in steps S1417 to S1420 and S1406 of FIG. 14(A), a normal call from the mobile telephone 4 to via the base station 5, which is different from the base station 3 to which the emergency call was made, is permitted. In addition, in the above-described condition, if the above-noted mobile telephone 4 at point P3 communicates via the base station 5, that is, via a base station that is different from the base station 3 to which the emergency call had been made, as shown in steps S1517 to S1521 and S1506 of FIG. 15(A), not only new normal calling, but also emergency calling is permitted.

As described in detail above, according to the present invention, as long as the mobile telephone is within the service area of a base station used for the emergency call, accurate recalling from an emergency call receiving switchboard of a mobile telephone which has made an emergency call is possible.

What is claimed is:

1. An emergency call control method for a mobile communications terminal is a mobile communications system, wherein when an emergency call is made, an identifacation code of a service area in which said emergency call is made is held, and when making a next call after said emergency call is made, a control channel for the next call is captured based on said held identification code.

2. An emergency call control method for a mobile telephone in a mobile telephone system which uses a dedicated control channel type multichannel access system as the method of radio circuit allocation, wherein:

when an emergency telephone number is called, the mobile telephone references a memory into which is stored the identification code of a service area within which calling is permitted;

the emergency call base station identification codes in a service area to be used when making an emergency call are stored beforehand and an emergency call is made via a control channel of a service area specified by said base station identification code;

the base station having the highest received field strength of the control channel radio signals of base stations in the service areas corresponding to said stored identification codes is selected, and the emergency call is made to the thus selected base station;

the base station identification code to which the emergency call was made is stored;

when a call is made after the completion of the emergency call, a calling signal is sent by using the control channel of the base station to which the emergency call was made, by means of the identification code which had been stored; and when a call is made next after the completion of said emergency call, in the case in which the base station recognizes the call and returns a call response signal, the identification code of the base station to which said emergency call was made is erased from memory.

3. An emergency call control method according to claim 2, wherein a coding error check code is added to said identification code of a base station to which an emergency call was made, and wherein a coding error detection is performed on said identification code, said base station identification code only being used in performing a normal calling operation if the result of said detection is normal.

4. An emergency call control method according to claim 2, wherein a coding error check code is added to said identification code of a base station to which an emergency call was made, and wherein said base station identification code is stored into two address areas, the difference between said two address areas being wider than a miswritten memory access area spread caused by a power supply voltage change expected when the power supply of said mobile telephone is switching on/off, and wherein when reading out said base station identification codes, a base station identification code which has no coding error detection is used to perform normal calling.

5. An emergency call control method according to claim 4, wherein a base station identification code stored in an address for which said coding error detection result is abnormal is overwritten with the base station identification code for which said coding error detection was normal, so that the data contents stored in each of said two areas are the same.

6. An emergency call control method for a mobile telephone in a mobile telephone system which uses a dedicated control channel type multichannel access system as the method of radio circuit allocation, wherein:

when an emergency telephone number is called, the mobile telephone references a memory into which is stored the identification code of a service area within which calling is permitted;

the base station identification codes in a service area which is used when making an emergency call are stored beforehand and an emergency call is made via a control channel of a service area specified by a thus stored identification code;

the base station identification code to which the emergency call was made is stored;

when a next call is made after the completion of the emergency call, a calling signal is sent via a control channel of the base station to which the emergency call was made, by means of the identification code which had been stored; and when a call is made next after the completion of said emergency call, in the case in which the base station recognizes the call and returns a call response signal, the identification code of the base station to which said emergency call was made is erased from memory.

7. An emergency call control method according to claim 6, wherein a coding error check code is added to said identification code of a base station to which an emergency call was made, and wherein a coding error detection is performed on said identification code, said base station identification code only being used in performing a normal calling operation if the result of said detection is normal.

8. An emergency call control method according to claim 6, wherein a coding error check code is added to said identification code of a base station to which an emergency call was made, and wherein said base station identification code is stored into two address areas, the difference between said two address areas being wider than the miswritten memory access area spread caused by a power supply voltage change expected when the power supply of said mobile telephone is switching on/off, and wherein when reading out said base station identification codes, a base station identification code which has no coding error detection is used to perform normal calling.

9. An emergency call control method according to claim 8, wherein a base station identification code stored in an address for which said coding error detection result is abnormal is overwritten with the base station identification code for which said coding error detection was normal, so that the data contents stored in each of said two areas are the same.

10. An emergency call control method according to claim 2, wherein in the case in which it becomes impossible to receive a radio signal from a base station in a service area which was used to make an emergency call, and it becomes possible to receive a radio signal of a service area which is written into the local memory and in which calling is possible, in said service area in which calling has become possible, new emergency calls are disabled and normal calling and reception of calls are permitted.

11. An emergency call control method according to claim 6, wherein in the case in which it becomes impossible to receive a radio signal from a base station in a service area which was used to make an emergency call, and it becomes possible to receive a radio signal of a service area which is written into the local memory and in which calling is possible, in said service area in which calling has become possible, new emergency calls are disabled and normal calling and reception of calls are permitted.

12. An emergency call control method according to claim 2, wherein in the case in which it becomes impossible to receive a radio signal from a base station in a service area which was used to make an emergency call, and it becomes possible to receive a radio signal of a service area which is written into the local memory and in which calling is possible, in said service area in which calling has become possible, new emergency calls and normal calling and reception of calls are permitted.

13. An emergency call control method according to claim 6, wherein in the case in which it becomes impossible to receive a radio signal from a base station in a service area which was used to make an emergency call, and it becomes possible to receive a radio signal of a service area which is written into the local memory and in which calling is possible, in said service area in which calling has become possible, new emergency calls and normal calling and reception of calls are permitted.

14. An emergency call control method according to claim 2, wherein:

a call refusal signal is returned with respect to a call received from a mobile telephone that had made an emergency call, said call received occurring before an operator of an emergency call receiving switchboard performs a disconnection operation; and a response signal is returned and call processing performed with respect to a call received from a mobile telephone that had made an emergency call, said received call occurring after an operator of an emergency call receiving switchboard performs a disconnection operation.

15. An emergency call control method according to claim 14, wherein in the case in which the operator at the emergency call receiving switchboard performs a disconnect operation or in which a prescribed amount of time has elapsed from the time of the formation of a link between said mobile telephone making said emergency call and said emergency call switchboard, a disconnect signal is sent to said mobile telephone via the call channel which was used for the emergency call to reset the call channel, and the thus reset call channel is re-allocated for normal calls.

16. An emergency call control method according claim 6, wherein:

a call refusal signal is returned with respect to a call received from a mobile telephone that had made an emergency call, said call received occuring before an operator of an emergency call receveing switchboard performs a disconnection operation; and a response signal is returned and call processing performed with respect to a call received from a mobile telephone that had made an emergency call, said call received occurring after an operator of an emergency call receiving switchboard performs a disconnection operation.

17. An emergency call control method according to claim 16, wherein in the case in which the operator at the emergency call receiving switchboard performs a disconnect operation or in which a prescribed amount of time has elapsed from the time of the formation of a link between said mobile telephone making said emergency call and said emergency call switchboard, a disconnect signal is sent to said mobile telephone via the call channel which was used for the emergency call to reset the call channel, and the thus reset call channel is reallocated for normal calls.

* * * * *

UNITED STATES PATENT AND TRADEMARK OFFICE
CERTIFICATE OF CORRECTION

PATENT NO. : 5,732,125
DATED : March 24, 1998
INVENTOR(S) : Mitsukazu Oyama

It is certified that error appears in the above-identified patent and that said Letters Patent is hereby corrected as shown below:

Column 9, line 59, after "receiving" insert a new paragraph

Column 12, line 5, delete "is" and insert

--in-- therefor

Signed and Sealed this

Twenty-ninth Day of September, 1998

Attest:

BRUCE LEHMAN

*Attesting Officer*             *Commissioner of Patents and Trademarks*